(12) United States Patent
Berestov

(10) Patent No.: US 6,862,364 B1
(45) Date of Patent: Mar. 1, 2005

(54) STEREO IMAGE PROCESSING FOR RADIOGRAPHY

(75) Inventor: Alexander Berestov, San Jose, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 766 days.

(21) Appl. No.: 09/767,210

(22) Filed: Jan. 18, 2001

Related U.S. Application Data

(63) Continuation-in-part of application No. 09/610,579, filed on Jul. 5, 2000, which is a continuation-in-part of application No. 09/561,291, filed on Apr. 28, 2000, which is a continuation-in-part of application No. 09/428,867, filed on Oct. 27, 1999, which is a continuation-in-part of application No. 09/428,286, filed on Oct. 27, 1999.

(51) Int. Cl.$^7$ .................................................. G06K 9/00
(52) U.S. Cl. ........................ 382/132; 382/154; 382/274; 378/41; 356/12; 348/42; 345/426
(58) Field of Search ................................ 382/128, 132, 382/154, 209, 286, 287, 288, 289, 218, 274; 378/8, 41, 98, 98.2, 42; 358/487; 356/12; 348/42, 45; 345/419–427

(56) References Cited

U.S. PATENT DOCUMENTS

| | | | | | |
|---|---|---|---|---|---|
| 4,472,037 | A | * | 9/1984 | Lipton | .......................... 352/57 |
| 5,818,959 | A | * | 10/1998 | Webb et al. | ................. 382/154 |
| 6,115,449 | A | * | 9/2000 | Jang et al. | ..................... 378/41 |

OTHER PUBLICATIONS

Kim et al. ("Robust 3–D Depth Estimation Using Genetic Algorithm in Stereo Image Pairs", Proceedings of IEEE Asia Pacific Conference on Circuits and Systems; pp. 357–360, Nov. 18–21, 1996; Seoul, Korea).*

Wei et al. ("Intensity– and Gradient –Based Stereo Matching Using Hierarchical Gaussian Basis Functions", IEEE Transactions on Pattern Analysis and Machine Intelligence, pages 1143–1160, vol. 20, No. 11, Nov. 1998).*

Yogesan, K., Eikelboom, R., and Barry, C. "Colour Matching of Serial Retinal Images. Lions Eye Institute and Centre for Ophthalmology and Visual Science" [online], Feb. 1999 [retrieved on Jun. 27, 2000]. Retrieved from the Internet:<URL: http://www.general.uwa.edu.au/u/robeik/OSA99/>.

Woods, A., Docherty, T., and Koch, R. "Image Distortions in Stereoscopic Video Systems," SPIE vol. 1915, Stereoscopic Displays and Applications IV (1993) pp. 36–48.

Berestov, A., "Stereo fundus photography: automatic evaluation of retinal topography," SPIE vol. 3957, Stereoscopic Displays and Virtual Reality Systems VII, (2000), pp. 50–59.

Talukdar, A., Wilson, D., "Modeling and Optimization of Rotational C–Arm Stereoscopic X–Ray Angiography," IEEE Transactions on Medical Imaging, vol. 18, No. 7, Jul. 1990, pp. 604–616.

* cited by examiner

*Primary Examiner*—Samir Ahmed
*Assistant Examiner*—Anand Bhatnagar
(74) *Attorney, Agent, or Firm*—Fitzpatrick, Cella, Harper & Scinto

(57) ABSTRACT

Pairs of stereo Xray radiographs are obtained from an X-ray imaging system and are digitized to form corresponding pairs of stereo images (602, 604). The pairs of stereo images (602, 604) are adjusted (410) to compensate for gray-scale illumination differences by grouping and processing pixel groups in each pair of images. Distortion in the nature of depth plane curvature and Keystone distortion due to the toed-in configuration of the X-ray imaging system are eliminated (412). A screen parallax for the pair of stereo images is adjusted (414) to minimize depth range so as to enable a maximum number of users to view the stereoscopic image, and particular features of interest.

41 Claims, 16 Drawing Sheets

STEREO IMAGE PROCESSING FOR RADIOGRAPHY

CROSS REFERENCES TO RELATED APPLICATIONS

This application is a continuation-in-part of commonly owned U.S. patent application Ser. No. 09/561,291, entitled "Stochastic Adjustment of Differently-Illuminated Images," by Alexander Berestov, et al. and filed on Apr. 28, 2000. This application is also a continuation-in-part of commonly owned U.S. patent application Ser. No. 09/428,867, entitled "Stereo X-ray Image Processing," by Alexander Berestov and filed on Oct. 27, 1999. This application is also a continuation-in-part of commonly owned U.S. patent application Ser. No. 09/610,579, entitled "Computer Assisted 2D Adjustment of Stereo X-ray Images," by Alexander Berestov and filed on Jul. 5, 2000. This application is also a continuation-in-part of commonly owned U.S. patent application Ser. No. 09/428,286, entitled "Fast Epipolar Line Adjustment of Stereo Pairs" and filed on Oct. 27, 1999. The content of each of these applications is hereby incorporated by reference in its entirety into the present application.

BACKGROUND OF THE INVENTION

1. Field of the Invention

The present invention relates generally to the field of three-dimensional imaging and analysis, and more particularly, to a system, method and computer readable medium for adjusting stereo X-ray images in order to correct errors and distortion resulting from illumination disparities, depth plane curvature, keystone distortion, and depth range.

2. Description of Background Art

For both real-world and computer-generated imaging applications, there is a growing need for display techniques that enable determination of relative spatial locations between objects in an image. Once the spatial relations are established, a user may move through the display space and manipulate objects easily and accurately. There are a variety of techniques for collecting as much information as possible about the object by analyzing the image.

One area of interest pertains to computer object recognition of binocular stereo, wherein three-dimensional shapes of objects of interest are created from images taken of a generally static scene by one or more imaging devices disposed at two different positions. The application of the binocular stereo to X-ray imaging entails projecting images onto a viewing device. With X-ray stereoscopic imaging, it will be apparent that the pair of X-ray images may be made using one X-ray source shifted by a distance, or by a pair of X-ray sources. In certain fields of use, the images are generally viewed on radiographs. A benefit of stereoscopic X-ray imaging is that it is an effective method for obtaining three-dimensional spatial information from two-dimensional X-ray images without the need for tomographic reconstruction. This much-needed information is missed in many conventional X-ray diagnostic and interventional procedures, e.g., in orthopedic or chest X-ray imaging. Binocular X-ray imaging has generally not been easy to implement because there are no visible surfaces on the radiograph that may be recreated in a three-dimensional image, as compared to reflective photography of images. Rather, with X-ray imaging, information about different objects are typically located within the same areas of the X-ray image.

Numerous algorithms for image matching have been proposed. They can roughly be classified into two categories. In the first category, the algorithms attempt to correlate the gray levels of image patches, assuming that the image patches present some similarity. In the second category, the algorithms first extract salient primitives or feature points from the images, such as edge segments or contours, and then match these features in two views. These methods are relatively fast, because only small subsets of the image pixels are used, but often fail because the chosen primitives cannot be reliably detected in the images.

Moreover, conventional methods of X-ray stereoscopic imaging have been unsatisfactory due to the insufficient manner of addressing the differences in illumination (i.e., brightness) amongst stereo image pairs. These differences may result based on the position of the X-ray sources, which project the images of the object upon a viewing device from different angles. In other instances, when the same object is exposed to two different X-ray sources or by one source shifted horizontally or temporally, the illumination of the scene changes depending upon the conditions. Such differences in illumination of the stereo images is problematic because, for example, the right part of the right image may be darker than the right part of the left image. More specifically, the illumination differences result in inconsistent brightness and contrast of the same area amongst the image pair. In order to be able to perform a matching analysis on the images and to create a three-dimensional spatial representation of the object from the pair of two-dimensional projection X-ray images, without the need for tomographic reconstruction, these illumination errors must be substantially reduced or eliminated. These illumination errors also lead to difficulties in observing images in stereo, in visual comparison of two images taken at different times, and in mathematical analysis such as stereo matching or image subtraction. Since it is often desirable to compare two images of the object taken at different times, or with different X-ray sources, conventional methods and systems insufficiently address the situation where the illumination in each image may be different, requiring correction before appropriate analysis can take place.

Conventional techniques that adjust the brightness and contrast of two images using a histogram adjustment method are problematic in that the equalization adjustment is made for the whole image, so the differences in illumination within the images remain unchanged. One solution proposed by the present inventor is to separate pixels in the left and right images into corresponding groups, and to adjust differently illuminated image intensities within associated groups of the left and right images. Although this technique for image processing works well with adjusting the brightness of color images, it would be desirable if this technique could be made applicable to adjusting illumination disparities from grayscale stereo image pairs generated from X-ray sources.

Another related problem with conventional techniques for stereoscopic X-ray imaging entails their failure to address the distortion resulting from the toed-in configuration of the X-ray sources. One type of distortion includes depth plane curvature, which could lead to incorrectly perceiving relative object distances on a display. In other applications, depth plane curvature may also disturb image motion. Typically, the distortion of the depth plane results in objects at the corners of the image appearing further away from the viewer (i.e., curved) as opposed to objects that are at the center of the image (i.e., appearing parallel to the surface of the display). Another type of distortion resulting from the toed-in configuration of the X-ray sources is keystone distortion. Accordingly, it is desirable to eliminate such distortions caused by the toed-in configuration of the X-ray sources.

When viewing X-ray stereo images on a monitor or display device, each viewer perceives depth differently. For example, some viewers may perceive depth more easily into the display device than out of the display device, and vice versa. Conventional stereoscopic imaging techniques do not adequately address this drawback of inconsistent depth range perception. Thus, it would be ideal if as many people as possible could view the stereo X-ray images, and especially so if one or more objects within the images are of particular interest to the viewers.

What is needed is a system and method for quickly obtaining three-dimensional (3D) spatial information from two-dimensional stereoscopic binocular pairs of X-ray radiographs, so that objects in the two-dimensional radiographs may be located in three dimensional space. It would be beneficial if some of the stereo methods used to analyze reflective photography of images could be applied to the analysis of projected pairs of grayscale images, for example, using one or more X-ray imaging devices or by using other stereo imaging techniques. It would also be desirable to have a stereo digital three-dimensional imaging system for enabling fast image processing and display, and quick and accurate correction of distortion appearing in the two-dimensional pairs of radiographs, namely resolving illumination disparities amongst the pairs, depth plane curvature, keystone distortion, and inconsistent depth range perception.

DISCLOSURE OF INVENTION

In accordance with the present invention, there is provided a system, method and computer readable medium for automated adjustment of pairs of stereo images (602, 604), representing in a computer readable form (i.e., digital form) pairs of stereo radiographs projected from X-ray sources. First, the pair of stereo images is adjusted (410) to compensate for illumination differences in gray-scale amongst the pair of stereo images. Second, distortion resulting from the toed-in configuration of the X-ray sources is corrected (412). In particular, depth plane curvature and keystone distortion captured in the pair of radiographs and appearing in the pair of stereo images are removed by rotating the pair of stereo images to place them in a parallel plane and by adjusting (e.g., "stretching parts of the") images to remove the vertical parallax, respectively. Third, a screen parallax is adjusted (414) to minimize depth range so as to enable a maximum number of people to view the stereoscopic image, and particular features of interest.

The first step requires adjusting differently illuminated pairs of stereo images (602, 604) of an object (112, 206, 802) to reduce and eliminate illumination errors. In one embodiment, the pair of stereo images (602, 604) is obtained by an X-ray imaging device (110, 304) that is coupled to a processing computer graphics engine (130, 302). In this embodiment, the pair of stereo radiographs is generated from X-ray sources emitting X-rays from two distinct locations in space and is processed digitally into a pair of stereo images. In another embodiment, the pair of X-ray radiographs appears on film or paper and is converted into a computer-readable form (i.e., pair of stereo images in digital format) by an input device (310) which may be an image converter or a graphics engine. Pixels within each image are assigned to groups (606-1, . . . , 606-n, 608-1, . . . ,608-n) of a selected width. Each group forms a line through the image. The lines may be either straight or curved, although a selection of longitudinally curved lines allows for greater reduction in illumination errors. Each group (606-1, . . . ,606-n) in the first image (602) is associated with a corresponding group (608-1, . . . , 608-n) in the other image (604). Next, the gray-scale intensity levels are determined for each pixel in each group (e.g., 606-1 and 608-1). From this data, the mean intensity level and variance for each group (e.g., 606-1 and 608-1) are determined. Thereafter, the images are equalized based on the mean intensity and variance, and then the pixel illumination amongst the pair of images is adjusted accordingly.

The second step involves removing distortion from the radiographs that appear in the corresponding pair of stereo images as a result of the toed-in configuration of the X-ray sources. To remove distortion in the nature of depth plane curvature, the pair of stereo images, comprising a first image (602) and a second image (604), is transformed from the physical toed-in configuration to a three-dimensional virtual space configuration, which effectively places the pair of images in the same (i.e., parallel) plane. In the described embodiments, the pixels in the first and second images are recalculated to lie in the plane parallel with that plane for the X-ray sources. To remove keystone distortion from the pair of radiographs that appears in the pair of stereo images, one embodiment includes a correlation matching technique to adjust rows of pixels line-by-line. That is, the pixels of the first and second images (602, 604) are shifted towards each other so that the center of the first image is aligned with the center of the second image. In another embodiment, the location(s) of physical pointers placed relative to the object are used in estimating epipolar geometry so that the pair of stereo images may be adjusted to remove the keystone distortion.

In a third step, the screen parallax is adjusted so as to maximize the number of people who may view the stereoscopic image. There are several implementations for improving the perception of the primary area of interest by adjusting the screen parallax. For example, the primary area of interest can be located near the front surface of the viewing device. By doing so, the depth range is minimized. Additionally, the entire image including the primary area of interest can be placed behind the screen when adjusting the screen parallax so as to improve the image perception.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
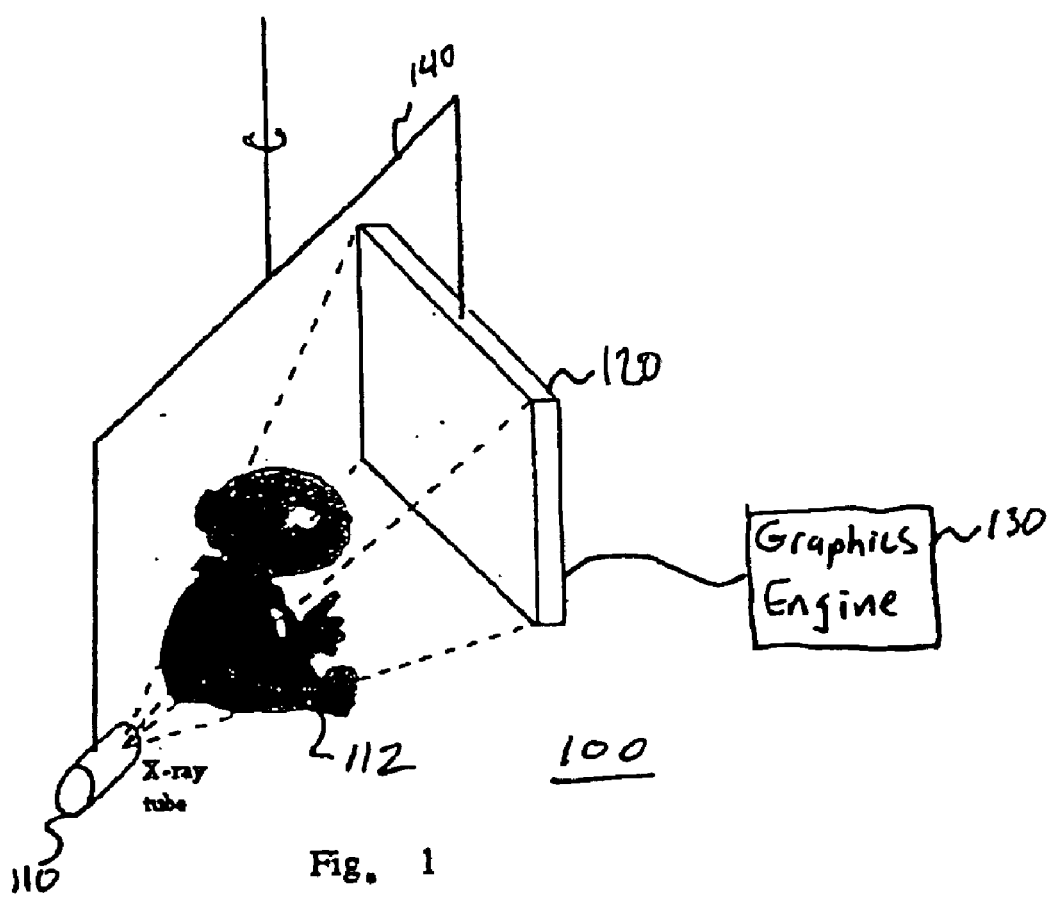
FIG. 1 is an embodiment of a C-arm type X-ray imaging system 100 for use with the present invention.

The present invention is directed to a system, method and computer readable medium for stereoscopic image processing that improves the image quality and depth perception of stereoscopic radiographs obtained with imaging devices. The method of the present invention includes a three step process. In the first step, the illumination of X-ray stereo pairs is adjusted to alleviate the illumination differences therebetween. In particular, the illumination of pixels in vertical columns for the pair of images is adjusted by equalizing the mean and standard deviation of these pixels. That is, upon calculating the mean and standard deviation in the vertical columns of the pixels, histograms are then adjusted to equalize the illumination. With the second step, the method of the present invention converts the toed-in stereoscopic X-ray images into a pair of images that are in the same plane, that is, both images being parallel with the surface of the display device and with the base line between the two X-ray sources. This effectively converts the stereo radiograph images into stereo images that have been "effectively" taken by a parallel X-ray source configuration. In one embodiment, the second step transforms the images in a physical "toed-in" space to a virtual "parallel" space. In another embodiment, the second step rotates the first image of the binocular pair clockwise, and rotates the second image counter-clockwise by the same angle. By doing so, the present invention eliminates depth plane curvature, which may lead to incorrectly perceiving the depth of images and to wrong calculations of relative object distances. Additionally, the second step also includes several embodiments for eliminating keystone distortion caused by the toed-in configuration of the X-ray sources. In the third step, the method adjusts the screen parallax so that as many people as possible may view the stereoscopic image. This step effectively minimizes the depth range, and in one implementation locates the primary area of interest near the front surface of the display device.

The present system, method and computer readable medium provide a means for quickly and accurately determining the geometry of a stereo X-ray imaging system, enabling the location of objects in the radiograph in three dimensional (i.e., virtual) space to be determined. For the purposes of this description, an "object" is the primary subject matter being radiographed. In a preferred embodiment of the present invention, the object is a human body; as in the case of a patient at a medical hospital. An "item" is located within the object (e.g., a bone, bullet or joint located within the body) or is disposed about the object (e.g., a "physical pointer" that absorbs or reflects X-rays such that a mark or point is visibly evident in the radiograph when captured by a radiograph system or device).

An X-ray is a type of penetrating electromagnetic radiation, having a shorter wavelength than light, and produced by bombarding a target, usually made of tungsten, with high-speed electrons. The first X-ray tube was the Crookes tube, a partially evacuated glass bulb containing two electrodes, named after its designer, the British chemist and physicist Sir William Crookes. When an electric current passes through such a tube, the residual gas is ionized and positive ions, striking the cathode, eject electrons from it. These electrons, in the form of a beam of cathode rays, bombard the glass walls of the tube and produce X-rays.

Most of the X-ray tubes in present-day use are modified Coolidge tubes. The Coolidge tube is highly evacuated and contains a heated filament and a target. It is essentially a thermionic vacuum tube in which the cathode emits electrons because the cathode is heated by an auxiliary current and not because it is struck by ions as in the earlier types of tubes. The electrons emitted from the heated cathode are accelerated by the application of a high voltage across the tube. As the voltage is increased, the minimum wavelength of the radiation decreases.

The larger and more powerful tubes have water-cooled anticathodes to prevent melting under the impact of the electron bombardment. The widely used shockproof tube is a modification of the Coolidge tube with improved insulation of the envelope (by oil) and grounded power cables. Devices, such as the betatron, are used to produce extremely hard X-rays, of shorter wavelength than the gamma rays emitted by naturally radioactive elements.

Figure 2:
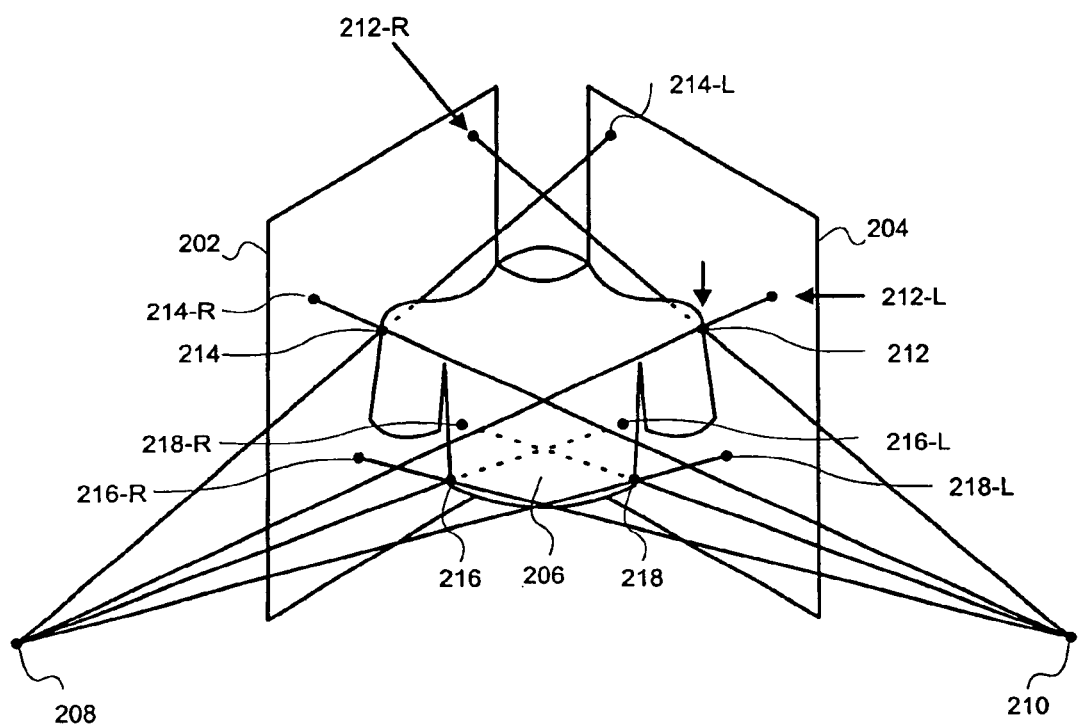
FIG. 2 is an illustration of the geometry of reference points 212, 214, 216, 218 disposed about an object 206 and appearing in the pair of images 202, 204 according to one embodiment of the present invention.

Referring to FIG. 1, a system 100 having one X-ray source 110 (e.g., tube 110) for producing three-dimensional X-ray stereo images from pairs of two-dimensional radiographs is shown. The X-ray stereo imaging system 100 further comprises a screen 120, and a graphics engine 130. X-ray tube 110 comprises one or more of the tubes described above that produce and emit X-rays, including the Crookes Tube, Coolidge Tube, modified Coolidge Tube, and betatron. It will be appreciated by those skilled in the art that there are a variety of systems for producing and emitting x-rays that pass through the object 112 (e.g., body of a human patient) to create varying impressions on the screen 120. For example, with one embodiment, a conventional C-arm mechanism 140 includes an x-ray source 110 rotating around object 112 in synchronization with screen 120. In one alternate embodiment, the X-ray source 110 and screen 120 remain in a fixed position while the object 112 is moved or rotated in order to generate the pair of radiographs; however, in most medical applications, it is preferable to keep the object 112 (e.g., patient) still to avoid injury. With another alternate embodiment, although not explicitly shown, two X-ray sources that remain substantially motionless between the emission of X-rays projected onto left and right screens (e.g., plates) can be used to produce a pair of radiographs of object 112. The geometry of this alternate embodiment is generally shown in FIG. 2. Additional embodiments include U-arm mechanisms, and other configurations of one plate used with one x-ray source. For discussion purposes herein, reference will be generically made to the phrase "C-arm type" to indicate that the invention can be practiced with any of these embodiments for mechanism 140, without loss of generality. In yet another alternate embodiment, the X-ray source can move in a vertical or diagonal direction. It will further be appreciated that many images may be taken of the object 112 and used to assemble a stereo movie. In order to create a stereo movie, the X-ray imaging system 100 takes pictures periodically upon and until a full rotation is completed. The method for creating a stereo image, described above, is then applied to each image and its clockwise neighbor. These stereo pairs may then be placed in a frame sequence in a "movie" format.

X-rays affect a photographic emulsion in the same way light does. Absorption of X-ray radiation by any substance depends upon its density and atomic weight. The lower the atomic weight of the material, the more transparent it is to X-rays of given wavelengths. For example, when the human body is X-rayed, the bones, which are composed of elements of higher atomic weight than the surrounding flesh, absorb the radiation more effectively and therefore cast darker shadows on a photographic plate.

Still referring to FIG. 1, the screen 120 provides an image of the object 112 in the nature of a two-dimensional radiograph. The screen 120 comprises one of various mediums in which to capture the two-dimensional X-ray images of the object. For example, screen 120 may include: 1) conventional X-ray film that uses a chemical emulsion or coating that is capable of visually depicting absorbed X-rays; 2) a digital sensor plate; 3) a photographic plate; or 4) any other medium that may be used to visually depict the capture X-ray image. Depending on the nature of screen 120, the captured radiographs are either transmitted directly to the graphics engine 130 if the digital plate is used, or are digitized by graphics engine 130.

Once the screen 120 and tube 110 have been placed in the correct alignment, a series of X-rays are taken of the object 112 at different angles by rotating the screen 120 and tube 110 about the object 112. X-rays are emitted from the tube 110 according to standard protocol and procedures implemented when taking radiographs. To produce stereo X-ray images, it will be evident to those skilled in the art that first and second radiographs are necessary to form the pair of stereo X-ray images.

Figure 3:
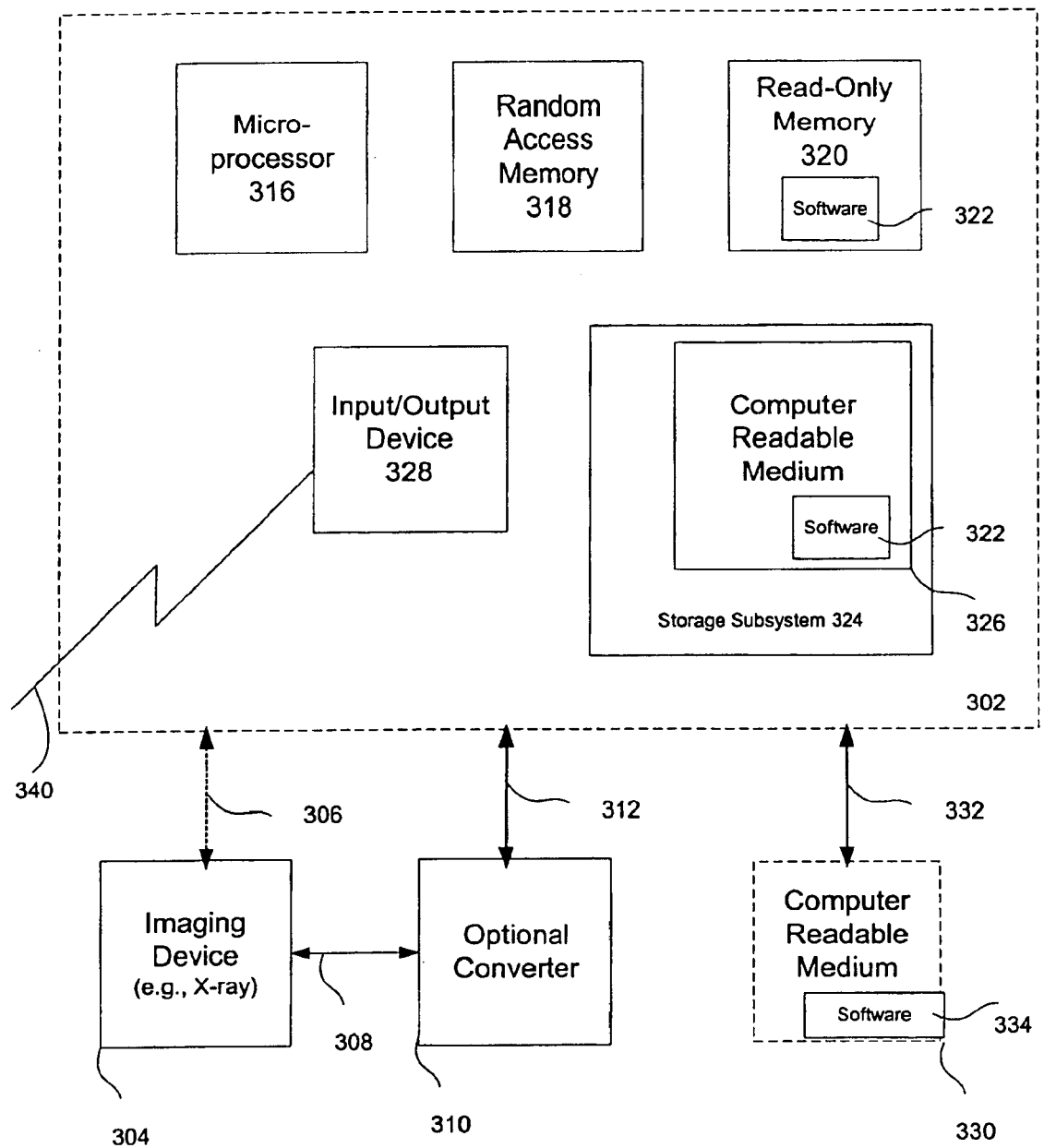
FIG. 3 is a block diagram of an X-ray imaging system 300 in accordance with an embodiment of the present invention.

Although the method of the present invention is generally described as being performed by system 100 having a graphics engine 130, for simplicity and without loss of generality, it will be appreciated by those skilled in the art that image processing may be implemented in general with a hardware unit having at least one processor, such as a personal computer. Notwithstanding, it is further noted that various systems with processing engines may be used to perform the method of the present invention. An embodiment is shown in FIG. 3, which includes a computing system 300 having graphics engine 302 for image processing. System 300 further includes an imaging device 304 (e.g., X-ray device) for obtaining the radiographs, and which may be attached directly to graphics engine 302 to provide as direct input, preprocessed pairs of radiograph images, as indicated by dotted line 306. In this embodiment, imaging device 304 may be a digital radiograph device or a video X-ray imaging device. The present specification describes the invention as being used in conjunction with digital radiograph systems, for illustration purposes only. Alternatively, when device 304 does not produce the digitized images of the radiographs representing object 112, device 304 may be coupled as indicated by line 308 to a converter 310. This alternative embodiment generally accommodates that situation where the X-ray imaging device 304 produces radiographs that are conventionally analog-based, or on paper or film, and which are transferred to converter 310. Converter 310 may be embodied in a number of ways to digitize the pair of radiographs, including for example, a scanner to convert the pair of radiographs supplied by the imaging device 304 into a computer readable format. In turn, graphics engine 302 receives the pair of processed images from the converter 310 as indicated by line 312.

The graphics engine 302 is controlled by a microprocessor 316, which may be a conventional microprocessor such as the Pentium® III by Intel Corporation, Santa Clara, Calif. System 300 also includes an operating system (not shown). A person of ordinary skill in the art will understand that the storage/memory also contains additional information, such as application programs, operating systems, data, etc., which are not shown in the figures for simplicity, but without loss of generality. The system 300 additionally includes a conventional random access memory (RAM) 318 for storing instructions and for providing fast access to relevant data, and conventional read-only memory (ROM) 320 for storing program code 322 and other required data. A storage subsystem 324 is also present for storing program code 322, data and images received for subsequent processing from the imaging device 304, converter 310, or other input devices (not shown) through an input/output device 328. The storage subsystem 326 includes a computer readable medium 326, which may be either internal to the graphics engine 302, or else may be located externally. When an external computer medium 330 is included, it is coupled to the graphics engine 302 as indicated by flow line 332 and includes program code 334. Input/output device 328 is also enabled to interface imaging device 304 and the converter 312, with various input, output and peripheral devices not explicitly shown (e.g., a display device, keyboard, touch-screen, mouse, printer, computer medium input device, and the like). It also will be understood that system 300 can also include numerous elements not shown, such as additional data, software, and/or information in memory, disk drives, network connections, additional memory, additional CPUs, LANS, input/output lines, etc.

Computer readable medium 326 can be any appropriate medium that has thereon, instructions, images, data structures, files and other data such as those of the software for the process steps described herein. These instructions are loaded from computer readable medium 326, 330 (e.g., a floppy disk, CD ROM, or other appropriate computer readable medium) into storage areas 318, 320 to enable the steps of the described embodiments to be performed when the instructions are performed (i.e., executed) by processor 316 (or another appropriate processor). In an alternative embodiment of the present invention, instructions can also be loaded into the computer medium and storage areas 318, 320, 324, 330 in the form of a carrier wave over network connection 346. For example, instructions can be downloaded into storage via an input device 328, or via a network connection, such as the Internet, a LAN, or a WAN.

When the radiographs are in a digital format, they are transmitted to the graphics engine 130, 302 by any means of digital transmission. "Digital transmission means" includes, but is not limited to, transmitting files: (1) over computer networks, such as sending the image to a server or node over a network (e.g., Internet, intranet, LAN, WAN, VPN, etc . . . ) as indicated by network connection line 340; (2) through a direct link between the image capture device and the engine, such as a direct link cable or similar wire line; and (3) via storage and retrieval from a digital recording medium, such as floppy or compact disk. Other means for transmitting information to the engine are also available as is known to those skilled in the art.

Figure 4:
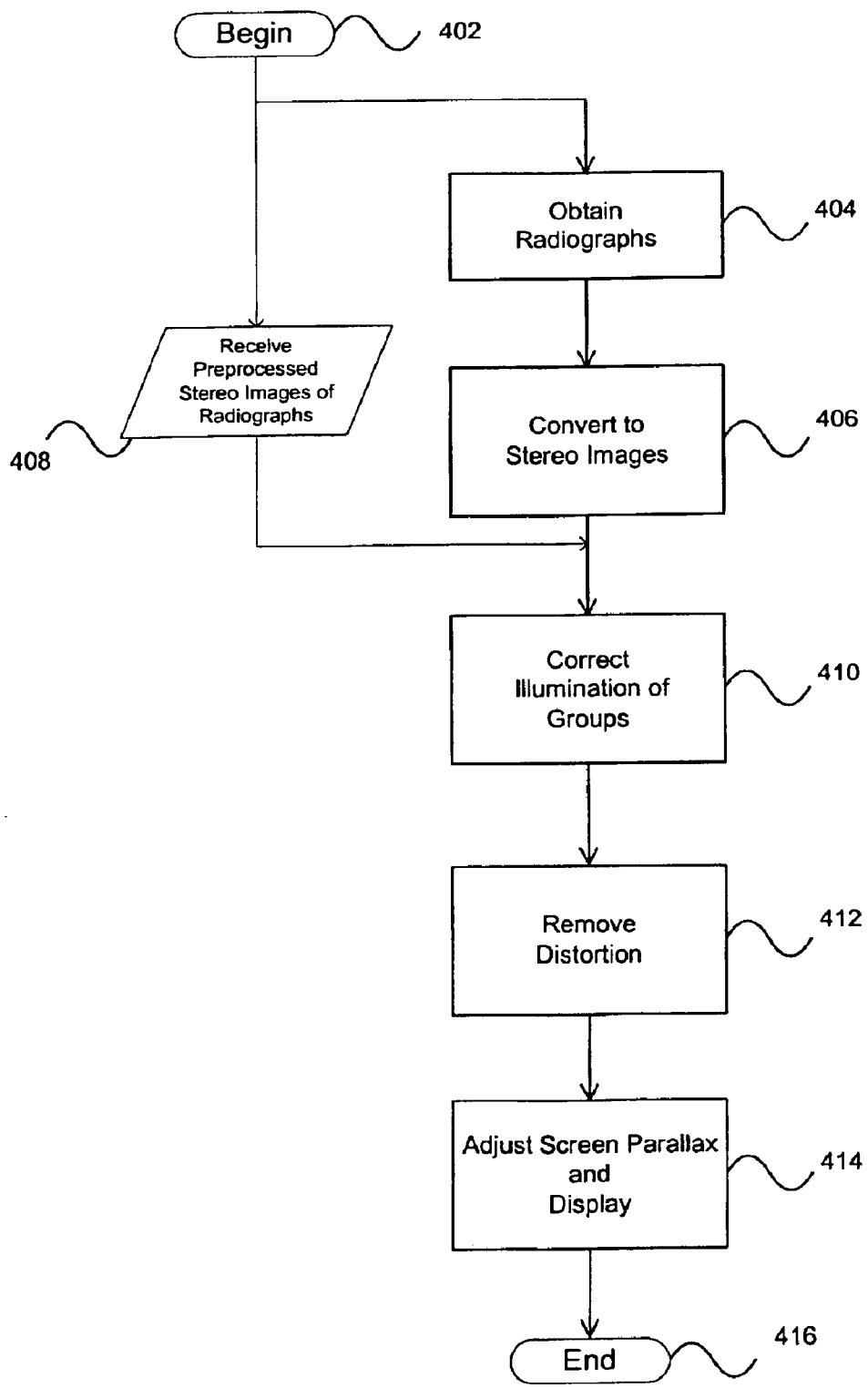
FIG. 4 is a flowchart of a preferred method 400 for stereo image processing for radiography according to the present invention.

Referring now to FIG. 4, there is shown a flow chart of the operation 400 of one embodiment of the present invention. The process begins at step 402 where the pair of radiographs are obtained 404 by the imaging device 304, and are converted 406 into a computer readable format (i.e., digitized) by converter 310. Alternatively, where the imaging device 304 is a digital radiograph device or video X-ray imaging device which preprocesses the pair of radiographs into a pair of stereo images ready for use by the graphics engine 302, step 408 indicates that the preprocessed stereo images are received by the graphics engine 302. Control then passes to step 410 where the illumination differences amongst the pair of stereo images are corrected. Next, at step 412, depth plane curvature and keystone distortion are removed from the pair of stereo images. Thereafter, the screen parallax is adjusted to remove depth range distortion as indicated by step 414, and a resulting stereo image is displayed for viewing. The process 400 concludes at step 416.

Figure 6:
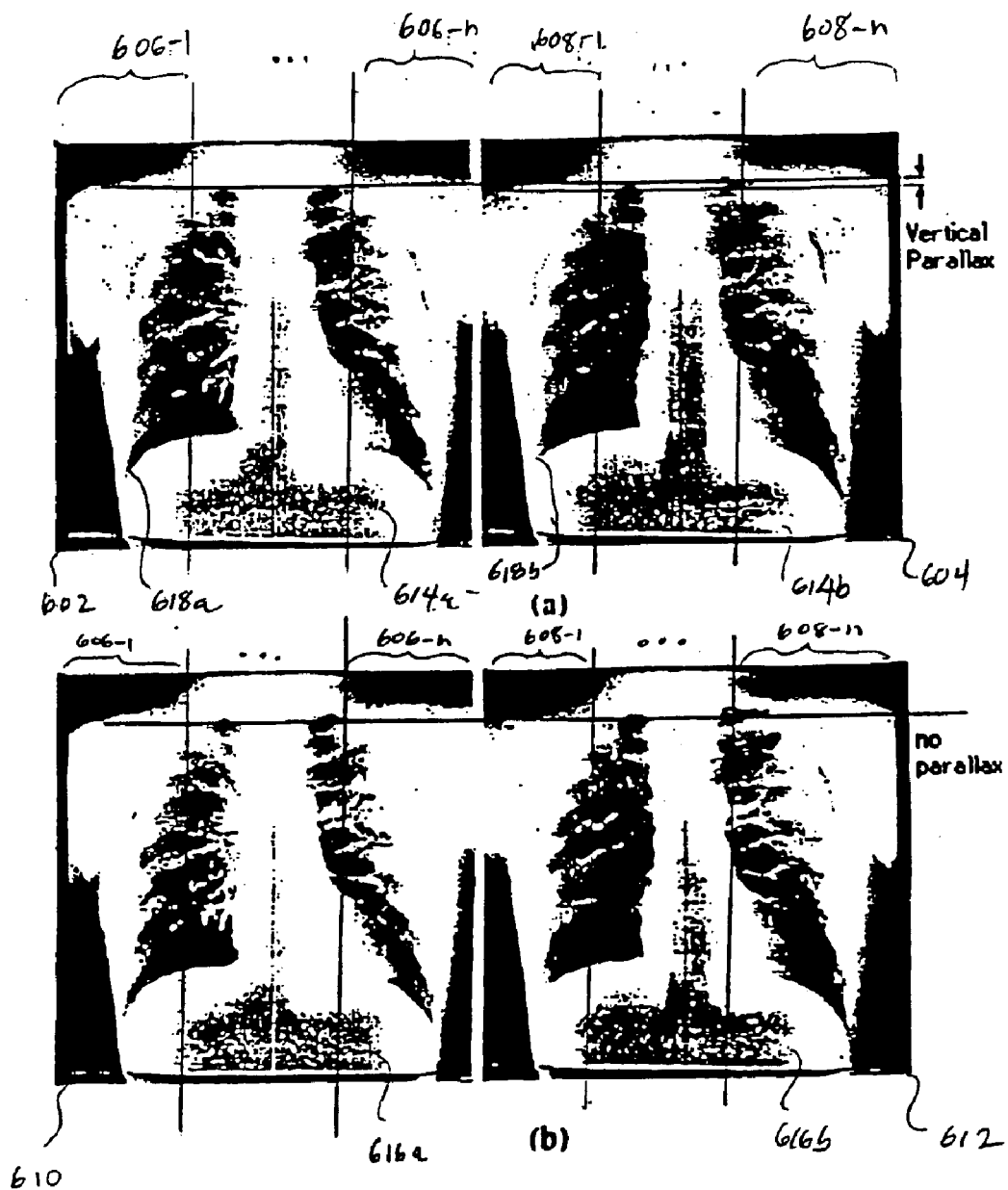
FIG. 6(*a*) is an illustration of differently illuminated and distorted stereoscopic images 602, 604 derived from a pair of X-ray radiographs, and FIG. 6(*b*) is an illustration of the corrected images of FIG. 6(*b*) in accordance with an embodiment of the present invention.
Figure 7:
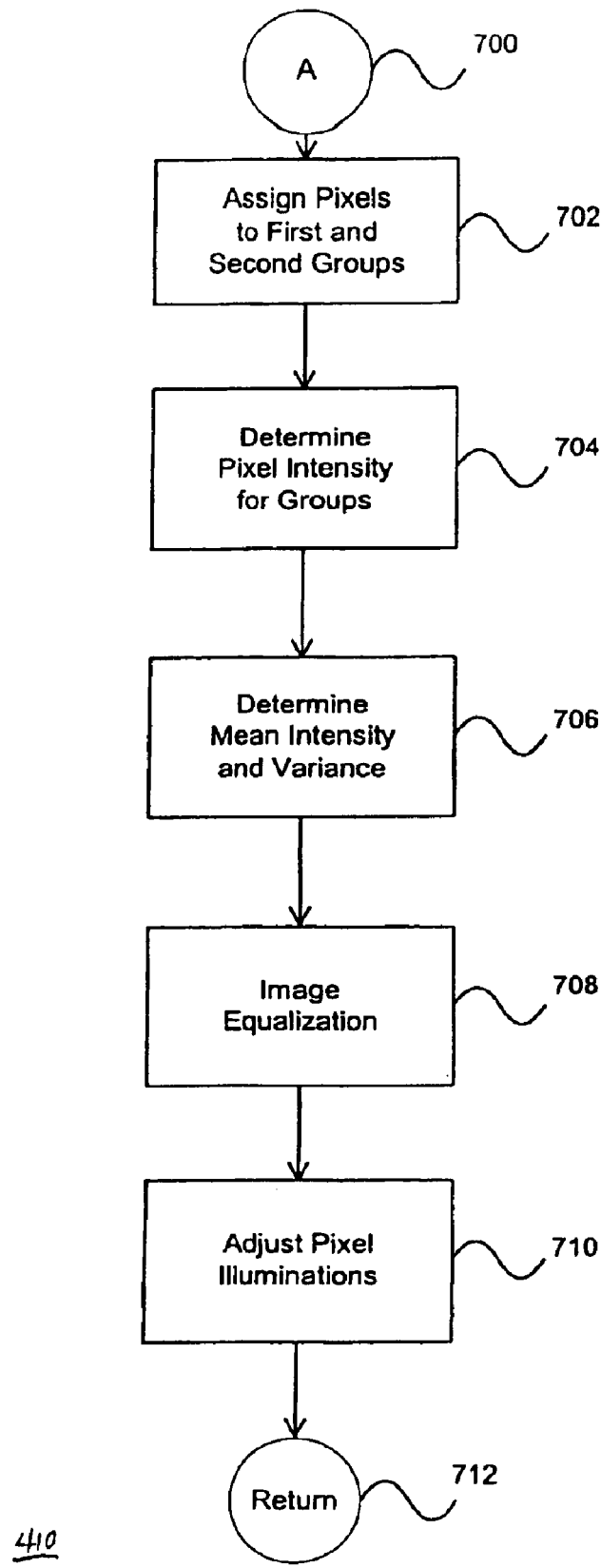
FIG. 7 is a flowchart of a method 410 for correcting illumination of groups of pixels according to the method of FIG. 4.

Reference is now made to the pair of images shown in FIG. 6 and to the flow chart of FIG. 7 to explain the substeps of one embodiment for implementing step 410 to correct the illumination differences amongst the groups of pixels. At substep 700, a pair of "digitized" images 602, 604 representing a pair of radiographs taken of an object (e.g., chest section of human body) is received at the graphics engine 302 for image processing. For convenience, the object has been referred to as 614*a* for the left image 602 of the pair of images, and as 614*b* for the right image 604 of the pair of images. Control is then passed to substep 702, where the pixels of each image 602, 604 are separated into groups, for example, pixels are assigned to groups 606-1, . . . , 606-n in the left image 602, and to groups 608-1, . . . , 608-n in the right image 604.

In a preferred embodiment, the pixels are grouped so as to form a straight line, as illustrated in FIGS. 6*a* and 6*b*. However, in other embodiments of the present invention, the pixels of the images can be grouped to form longitudinal lines, and lines of other curvatures. For example in one alternate embodiment, the pixels are grouped in straight lines perpendicular to the direction of movement of the X-ray imaging device 304. In another embodiment, the pixels are grouped in longitudinal lines, with the lines perpendicular to the direction of movement at their point of intersection with the direction of movement. Yet, in other embodiments, the pixels are grouped into either straight or longitudinal lines that are not perpendicular as described above, although such a grouping may consequently result in removing fewer illumination errors. As those skilled in the art will recognize, an object having a generally curved shape is well-suited for groups of pixels defined by longitudinal lines, which tend to result in more accurate elimination of illumination errors. Further, it will become apparent that the pixels in a group (e.g., 606-1) may be as narrow as one pixel, or as wide as the entire image. Also, those skilled in the art will recognize that narrower groups allow for greater accuracy in detecting illumination errors.

Selection of the particular groups of pixels in the pair of images are identified by the processor 316, which then performs calculations for image processing based upon the data stored in RAM 318, ROM 320, in the storage subsystem 324, or computer medium 330. Such data includes identified pixels to be assigned to groups. After selecting the pixel groups 606-1, . . . , 606-n, 608-1, . . . , 608-n, pixels in each group are measured by the computing system 300 to determine their intensity as indicated in substep 704. Intensity values are calculated for each pixel as a function of grayscale values. Each pixel along a given line has an associated grayscale intensity. It is noted that the substep 702 of determining the corresponding groups of pixels in the pair of images may be performed immediately after the pixel intensities are determined in substep 704. The differences in pixel intensities amongst the pair of images 602, 604 is apparent in FIG. 6*a*, where point 618*a* is a pixel in the left image 602, and point 618*b* is the corresponding pixel in the right image 604. After the images are arranged into groups, point 618*a* will be part of group 606-1, and point 618*b* will be part of corresponding group 608-1. As can be seen from the left 602 and right 604 images, the intensity of the left point 618*a* is defined differently (e.g., darker) in than the corresponding right image point 618*b*.

One cause of this difference in intensity results from the different horizontal toed-in position of the X-ray sources 110, 208, 210 in emitting X-rays to produce the pair of radiographs. Producing a radiograph of an object from the X-ray source at two locations can lead to the situation where the left-most pixels of the left image 602 may not represent the same part of the object 614*a*, 614*b* as the left-most pixels of the right image 604. Thus, any information that is already known, for example the distance between the X-ray source (or alternatively the distance the X-ray source 110 has moved between radiographs produced; distance between sources 208, 210), can be used to improve accuracy. In addition, a conventional matching algorithm known by those skilled in the art and described, for example, in G. Xu and Z. Zhang, *Epipolar Geometry in Stereo, Motion and Object Recognition*, Kluwer Academic Publishers, Dordrecht, Netherlands, 1996, pp. 221–245, which is incorporated by reference herein in its entirety, may be employed to identify corresponding pixels in each image 602, 604. In another embodiment, however, it may be assumed that the location of a group in the left image 602 will be the same as the location of the corresponding group in the right image 604.

After substep 704, in substep 706, the mean intensity value and variance of each group 606-1, . . . , 606-n, 608-1, . . . , 608-n are calculated, followed by substep 708, where image equalization is performed. Control is then passed to substep 710 to adjust the pixel illuminations amongst the groups of pixels resulting in the elimination of illumination errors between the two images 602, 604 of the pair. Step 410 concludes with substep 712.

In one embodiment for implementing step 410 according to the substeps in FIG. 7, to correct illumination differences between the pair of images 602, 604, the intensity of each pixel in a group is determined based upon where, if $X_1$ and $X_2$ are discrete random variables with values $\{_i^1$ and $\{_i^2$, then the expected or mean values of $X_{1,2}$ are defined by $$EX_{1,2} = \mu_{1,2} = \sum_i x_i^{1,2} p(x_i^{1,2}), \quad (1)$$

where p is the probability function. The quantities $$EX_{1,2}^2 - \mu_{1,2}^2 = \sigma_{1,2}^2 \quad (2)$$

are the variances of $X_{1,2}$ or the expected values of the square of the deviations of $X_{1,2}$ from their expected values. Variables $X_{1,2}$ should be adjusted as in substep 710 so that the expected values $\mu_{1,2}$ and variances $\sigma_{1,2}^2$ are the same for both variables as in substep 708. In the simplest case, to adjust pixel illumination in substep 710, a linear transformation may be used:

$$X_2 = aX_1 + b, \quad (3)$$

where a and b are constant parameters. The determination of the mean intensity and variance in substep 706 may be found by the substitution of (3) into (1) and (2), which gives:

$$b = \mu_2 - a\mu_1, \quad (4)$$

$$a = \sqrt{\frac{\sigma_2^2}{\sigma_1^2}}.$$

Assume the pixel brightness level in the pixel of point 618a is $X_1$ and in the pixel of point 618b is $X_2$. This provides the mechanism for image adjustment in substep 710. Expected values and variances for both groups 606-1 and 608-1 can be calculated using a probability function such as p=1/H, where H is the number of pixels along the lines in the image. Those skilled in the art will appreciate that other probability functions could be used, such as exponential, normal, or functions derived from the data. In addition, higher order moments could also be used for more accurate adjustments.

The next step is to recalculate pixel brightness in one or both images using equation (3), as in substep 710. That is, the intensity of each individual pixel is recalculated (i.e., adjusted) in either or both images to yield associated pixels of approximately equal intensity. One manner for doing so includes comparing the mean intensity and variance of the groups amongst each other, that is, each pixel in a group (e.g., 606-1) of the left image 602 is compared to the corresponding pixel in the similarly situated group (e.g. 608-1) of the right image 604. Once the mean intensities and variances related to performing image equalization has been found in substep 708, either one image may be adjusted to the other, or both images may be adjusted to some values $\mu$ and $\sigma^2$, as in step 710. Alternatively, average values such as $\mu=(\mu_1+\mu_2)/2$, exponential values $\sigma^2=(\sigma^2+\sigma^2)/2$, or some other desirable values could be used. As such, in substep 710, the adjustment of pixel brightness amongst the columns of the pair of images 602, 604 may be implemented in several manners, so long as $\mu$ and $\sigma^2$ are equalized for the pair. This adjustment is made for grayscale values, and where there are different components of grayscale values, the results may then be recombined in order to obtain adjusted grayscale images. It is also possible to estimate the average disparity and to equalize the expected value and variance in the shifted groups, in order to obtain a more precise result.

The C-arm type mechanism 140 of the X-ray system 100 is convenient for fast and accurate stereo pair acquisition. From the geometric point of view, system 100 is similar to the toed-in binocular stereo system, as is an X-ray system having two X-ray sources disposed at fixed locations; the geometry of both types of systems are seen more clearly in the illustration of FIG. 8. With either systems, the toed-in configuration of the X-ray source(s) for stereoscopic systems results in two significant drawbacks, namely depth plane curvature which could lead to incorrectly perceived relative object distances, and keystone distortion (i.e., vertical parallax).

Figure 8:
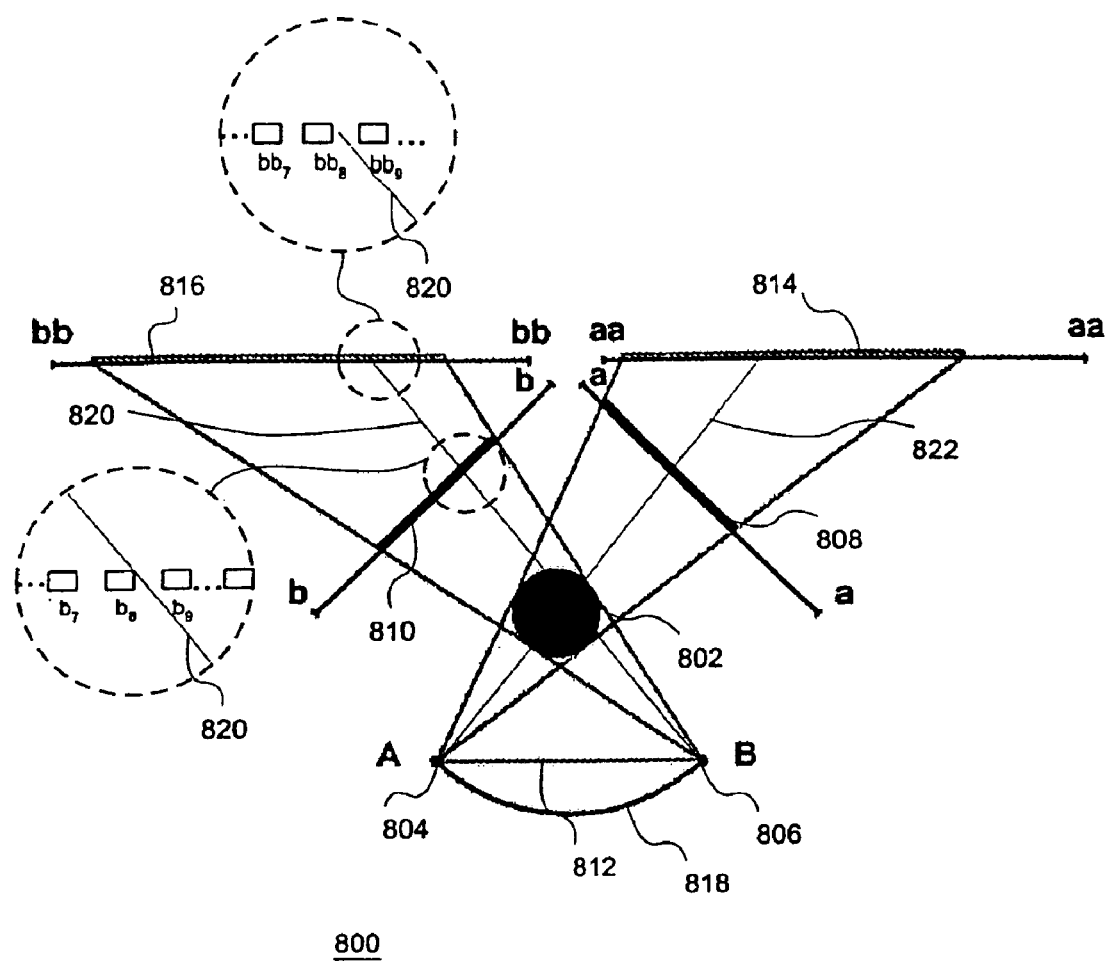
FIG. 8 is an illustration of the toed-in geometry and a parallel geometry for an X-ray imaging system.

The toed-in configuration is seen in FIG. 8, where in order to form a stereo pair of images representing the pair of radiographs of object 802, one or more X-ray source(s) emit X-rays from two source locations 804, 806. The references to a—a, b—b represent the physical locations of the respective digital sensor plates 808, 810 (interchangeably used herein with "physical plates 808, 810") that respectively contain the pair of images. The distortion in the nature of depth plane curvature results in objects at the corners of the image appearing further away from the viewer (i.e., curved) as opposed to objects that are at the center of the image (i.e., appearing parallel to the surface of the display). This distortion can be eliminated by making the two images parallel to the base line 812 connecting the two source locations 804, 806. In order to make the stereo system parallel, the method of the present invention rotates the pair of images in three-dimensional virtual space. The references to aa-aa, bb-bb represents the new "virtual" plates 814, 816 of the corrected images. That is, when the pair of images are transformed from the physical toed-in configuration to a parallel configuration, the image taken at the physical location of sensor plate 808 is mapped into virtual space at virtual plate 814, and the image taken at the physical location of sensor plate 810 is mapped into virtual space at virtual plate 816. As will be discussed below, there are several embodiments for eliminating depth plane curvature by transforming the toed-in pair of stereo images into a parallel configuration.

Figure 9:
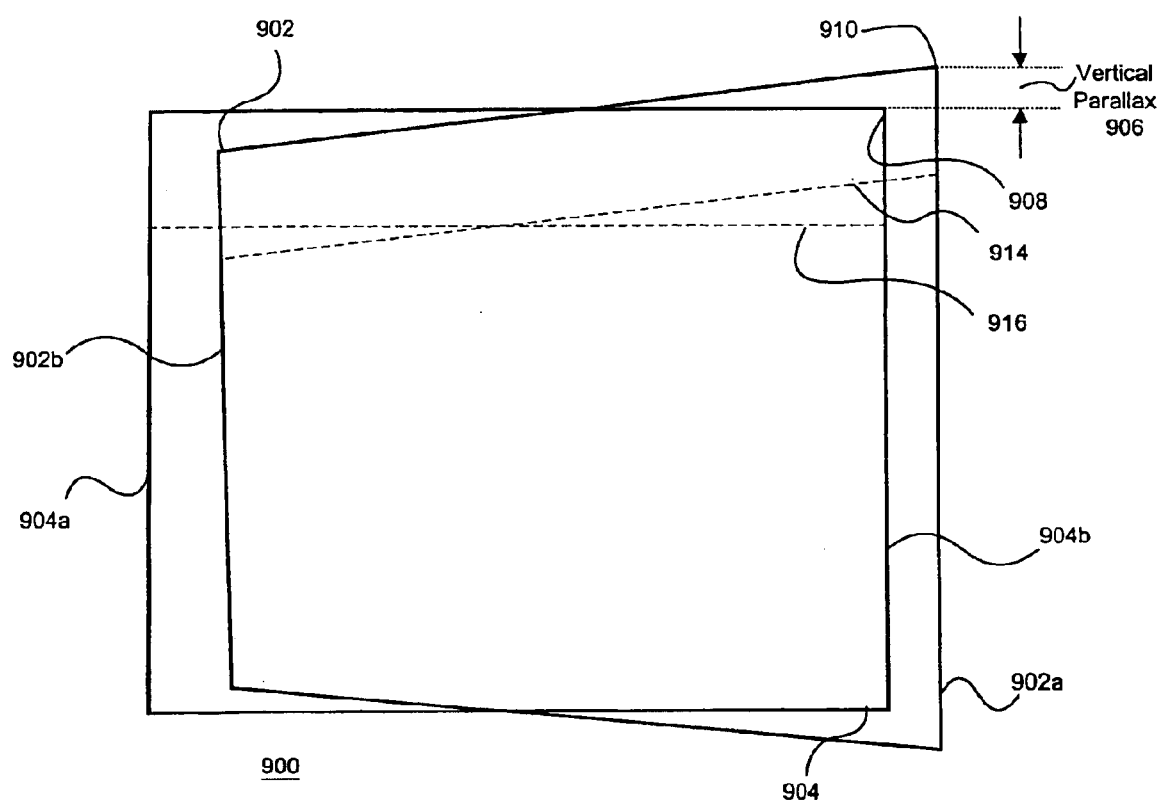
FIG. 9 is an illustration of stereoscopic keystone) distortions resulting from the geometries of the system of FIGS. 2 and 8.

Keystone distortion is shown in the illustration 900 of FIG. 9, where the vertical parallax 906 (henceforth interchangeably used with vertical difference 906) in the stereoscopic image is caused by the baseline of the two source locations 804, 806 being unparallel to the surface of the plates 808, 810. Stated more generally, the radiographs are captured at two imaging locations that are located in different planes. Assuming that object 802 is a square for example, one image 902 (e.g., of the square) at sensor plate 808 appears larger at one end of the viewing device (e.g., right side 902a) than the other (e.g., left side 902b). The effect is usually reversed in the other image 904 at sensor plate 810, where the square appears larger at one end (e.g., left side 904a) than the other end (e.g., right side 904b). Keystone distortion causes a vertical difference 906 between homologous points 908, 910. The amount of vertical parallax is generally observed to be the greatest in the corners of an image, and increases accordingly with the rotational separation 818 of the two source locations 804, 806, thereby causing difficulties in stereoscopic analysis and image perception. As will be discussed below in further detail, one aspect of the present invention is to remove the vertical parallax.

Figure 10:
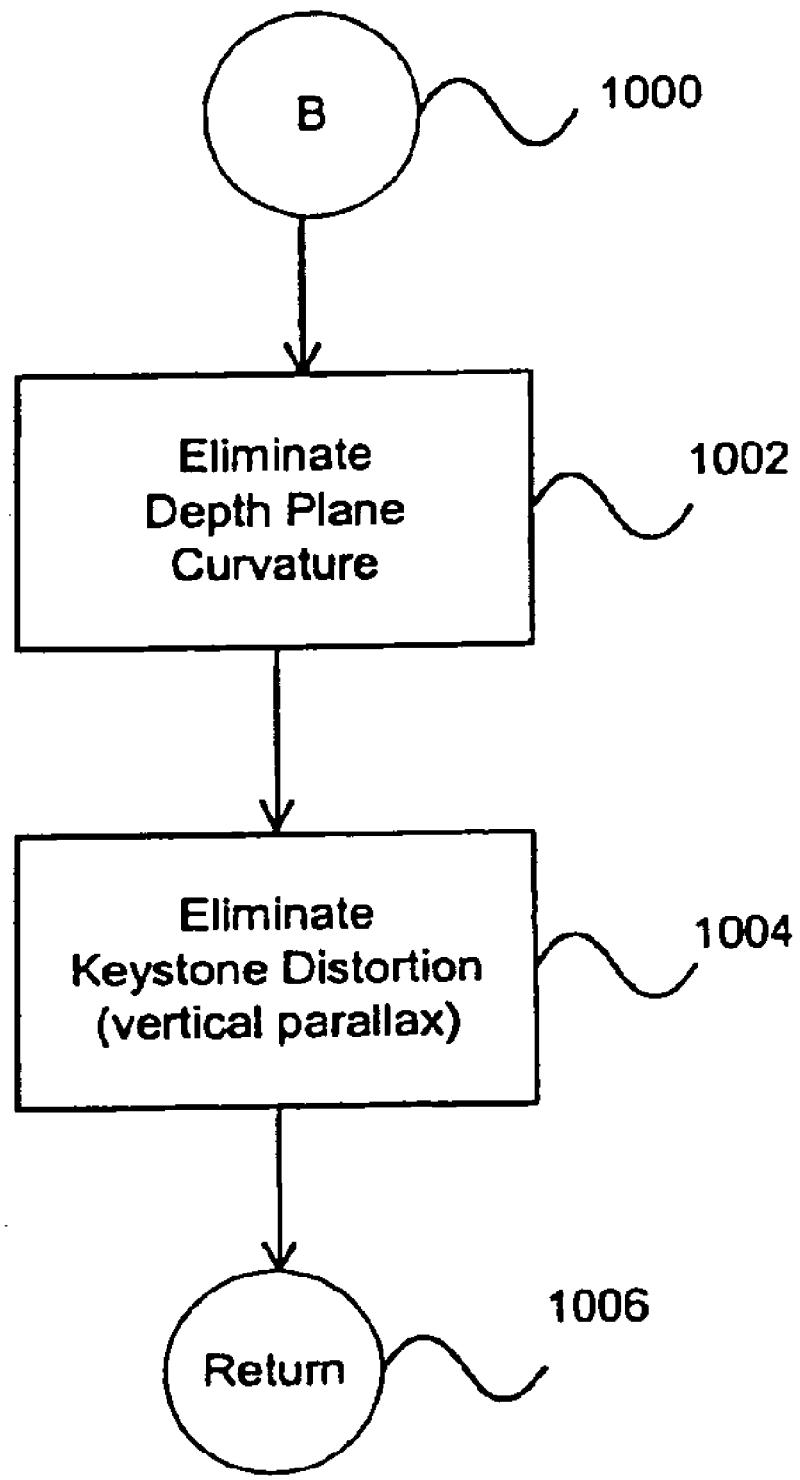
FIG. 10 is a flowchart of a method 412 for removing distortion amongst the pair of images 202, 204, 602, 604 according to the method of FIG. 4.

Reference is made to the flow chart of FIG. 10 to explain one embodiment for implementing step 412 to remove distortion amongst the pair of images 602, 604 due to the toed-in configuration of the X-ray source(s). At substep 1000, control is passed to substep 1002, where the depth plane curvature between the pair of stereo images is eliminated. Thereafter, in substep 1004, keystone distortion (i.e., the vertical parallax) is removed. Substep 1006 indicates the conclusion of step 412.

Figure 11:
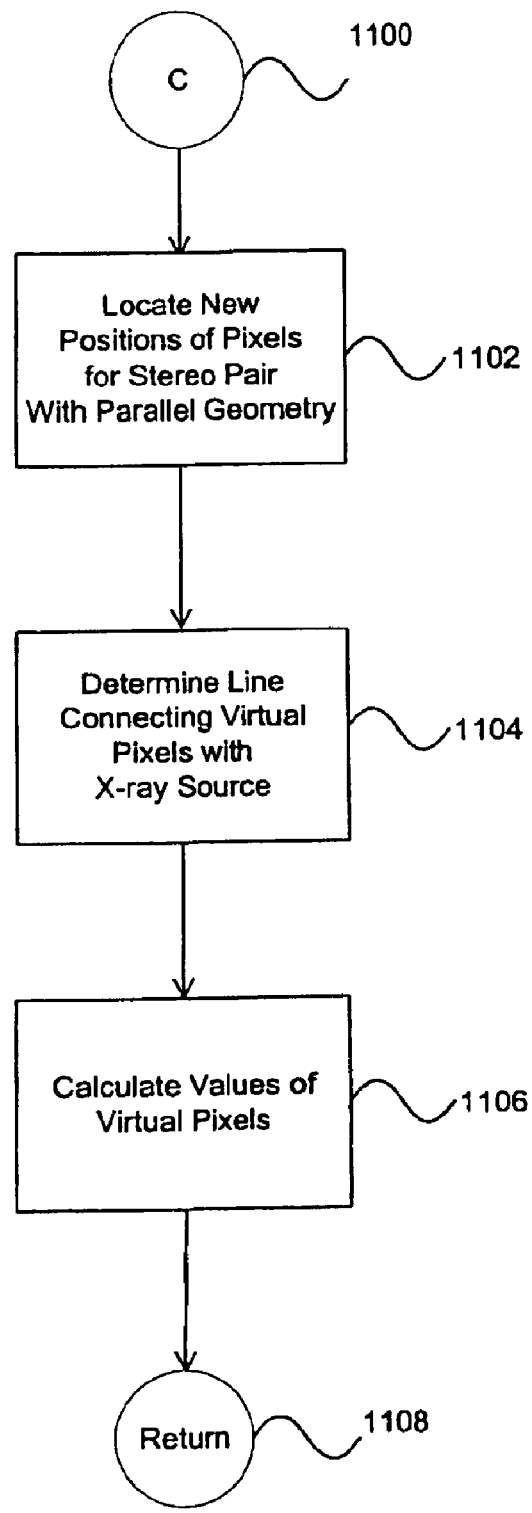
FIG. 11 is a flowchart of a method 1002 for eliminating depth plane curvature amongst the pair of images 202, 204, 602, 604 according to the method FIG. 10.

In the flow chart of FIG. 11, the process substeps of one preferred embodiment are shown for transforming the toed-in configuration of the pair of images 602, 604 to a parallel configuration so as to eliminate depth plane curvature distortion according to substep 1002. At substep 1100, control is passed to substep 1102, where the new positions of pixels, at the virtual plates 814, 816 with parallel geometry, are located for the stereo pair 602, 604. Thereafter, substep 1104 is initiated to determine the lines (e.g., 820, 822) connecting each of the virtual pixels $aa_1, \ldots, aa_n$; $bb_0, bb_1, \ldots b_n$ with the corresponding source locations 804, 806. Next, substep 1106 is performed in order to calculate the values of the virtual pixels $aa_0, aa_1, \ldots, aa_n$; $bb_0, bb_1, \ldots b_n$ that are in the virtual plates 814, 816 based on where lines (e.g., 820, 822) fall between pixels on plates 808, 810. Substep 1002 concludes with substep 1108. In order to implement these substeps, it is noted that the sensor plates 808, 810 each comprises a plurality of "real" pixels $a_0, a_1, \ldots, a_n$; $b_0, b_1, \ldots, b_n$, respectively, in the physical space, and that the virtual plates 814, 816 contains a representation of such "real" pixels in the form of virtual pixels $aa_0, aa_1, \ldots, aa_n$; $bb_0, bb_1, \ldots, bb_n$ transformed from the physical space but in the "virtual" space. Real pixels $a_0, a_1, \ldots, a_n$, and virtual pixels $aa_0, aa_1, \ldots, aa_n$ are not explicitly shown in FIG. 8 for brevity. That is, every pixel of the "converted" (i.e., with parallel geometry) pair of images in the virtual space can be calculated from a corresponding position on the respective physical sensor plates 808, 810, as a weighted function of the closest (i.e., adjacent) "real" pixels. Various known interpolation techniques can be used to determine the weighted function between the "real" pixels (e.g., $b_0, b_1, \ldots, b_n$) in order to derive the resolution of the virtual pixels. Alternatively the "real" pixels (e.g., $b_0, b_1, \ldots, b_n$) can be projected onto the virtual plates 814, 816, and the new values of the virtual pixels (e.g, $bb_0, bb_1, \ldots, bb_n$) can be calculated by interpolation to obtain the necessary resolution of the "converted" image. Accordingly, the transformation of the pair of images from the physical "toed-in" space to the virtual "parallel" space places the pair of images in the same plane which is parallel to the base line 812 between the two source locations 804, 806 used to emit X-rays. It will become apparent to those skilled in the art that, for simplicity and without loss of generality, the substeps of FIG. 11 have been described generally with respect to one line 820, and that such substeps are applicable to all pixels in the physical plates 808, 810. Further, it will be recognized by those skilled in the art that the virtual plates 814, 816 may be placed closer to or farther away from base line 812, so long as parallel thereto, and that substeps 1102–1106 may be modified accordingly therewith to determine the new virtual pixels.

Figure 12:
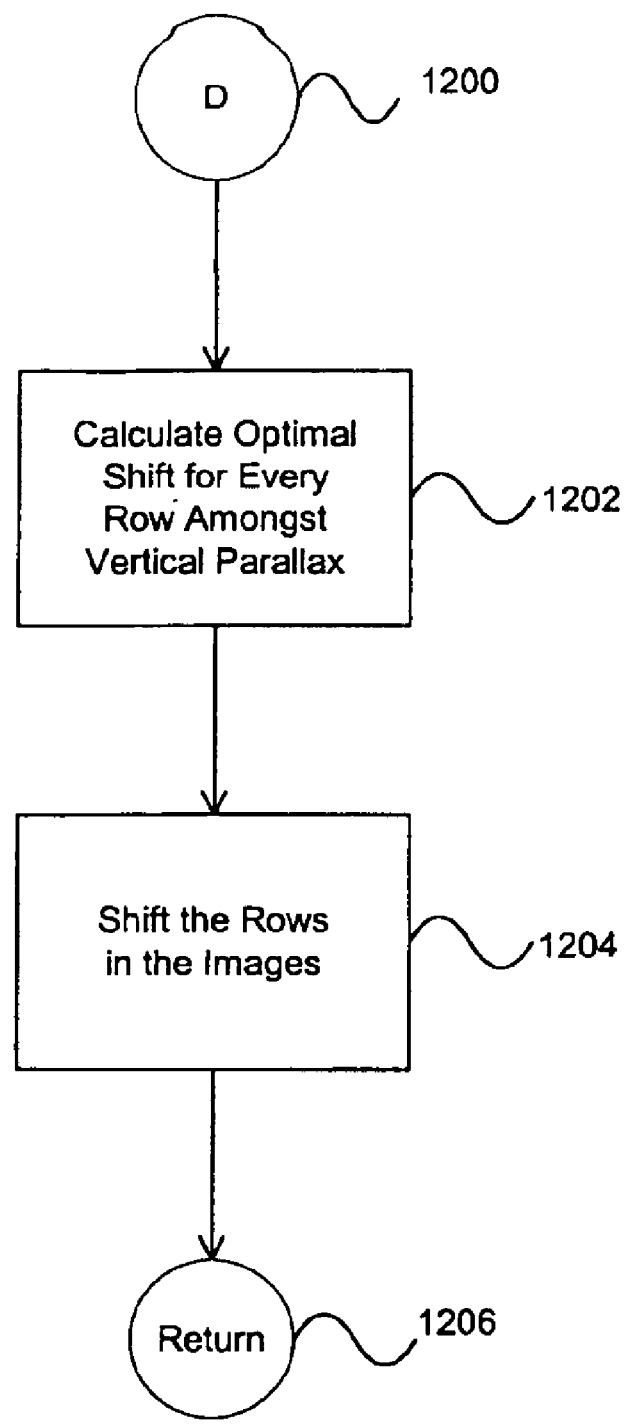
FIG. 12 is a flowchart of a method 1004 for eliminating Keystone distortion amongst the pair of images 202, 204, 603, 604 according to the method of FIG. 10.

Referring to FIG. 12, one embodiment for implementing step 1004 of FIG. 10 to eliminate keystone distortion amongst the pair of stereo images 602, 604 is described as comprising several substeps. At substep 1200, control is passed to substep 1202 where an optimal shift amount is calculated for every pixel in every row (e.g., line) amongst the vertical parallax between the pair of images 602, 604. After step 1202, step 1204 is invoked where the pixels of a row are shifted to the new location to eliminate the vertical difference. Step 1004 concludes as indicated with substep 1206. An example of the resulting pair of stereo images 610, 612 that have been shifted to remove keystone distortion is shown in FIG. 6(b).

Preferably, substep 1202 is implemented with the graphics engine 103, 302 performing epipolar line-to-line adjustment on the pair of images. The vertical difference necessitating the line adjustment is seen in FIG. 9, where pixel row 914 of image 902 is clearly distorted with respect to the corresponding pixel row 916 of image 904. Application of epipolar line-to-line adjustment not only eliminates keystone distortion, but also eliminates errors that appear because the rotational axis of the object is not perfectly vertical. The method of epipolar line to line adjustment is further described in U.S. patent application Ser. No. 09/428,286, filed on Oct. 27, 1999, entitled "Fast Epipolar Line Adjustment of Stereo Pairs," referenced above. As will be described below, epipolar line-to-line adjustment includes a fast correction process, which adjusts the pixels in the pair of images and sets them along the same rows, that is, aligns the pair of images by adjusting the epipolar lines.

Figure 14:
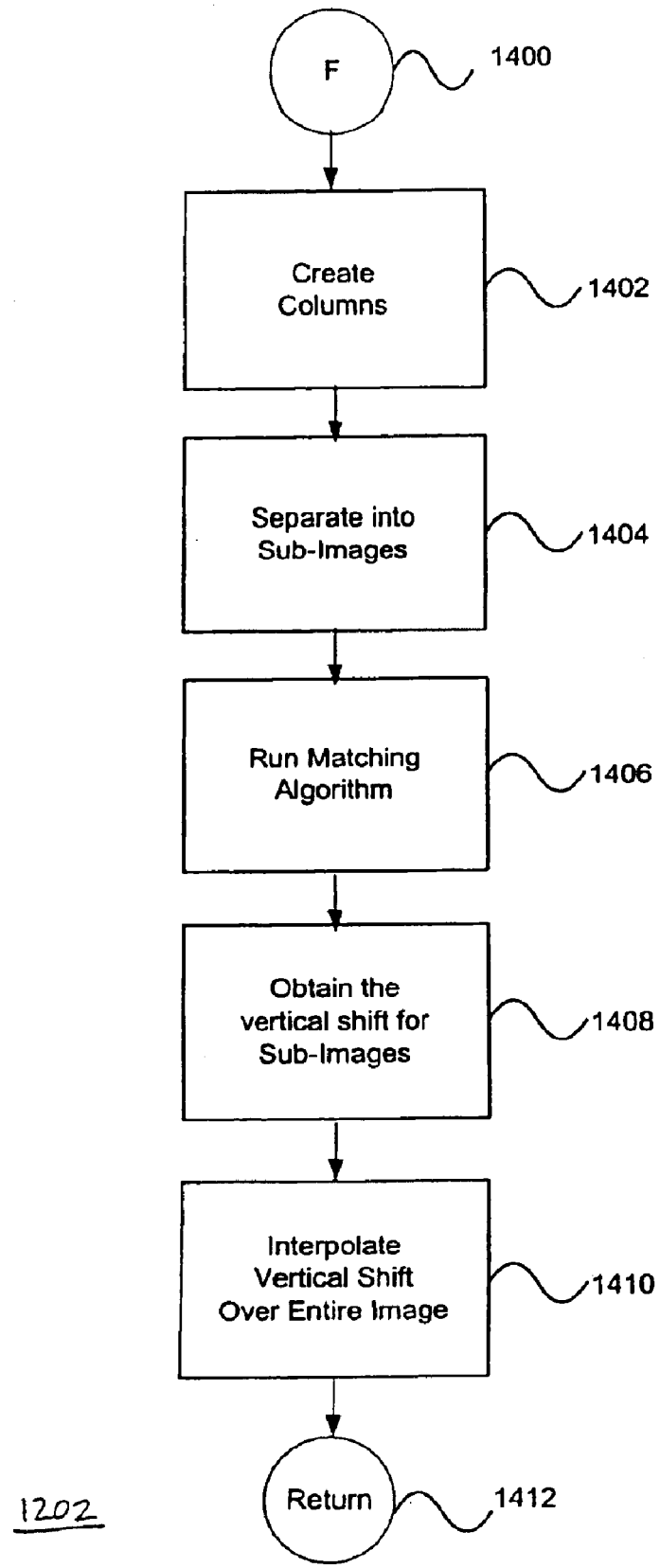
FIG. 14 is flowchart of a method 1202 for determining pixel shift amounts in rows of the images 202, 204, 602, 604 according to the method of FIG. 12.

Referring to the flow chart of FIG. 14, one manner for implementing the substep 1202 with epipolar line-to-line adjustment is described as comprising several substeps. At substep 1400, control is passed to step 1402 where "two search" columns on the images 602, 604 are created. Each column in one image comprises one or more points that will be matched to a corresponding point in the other image. By creating "matching columns," the matching algorithm can execute with greater accuracy while avoiding substantial processing times by limiting the range of points. Thereafter, in substep 1404 each of the pair of images 602, 604 are separated into gray-scale "sub-images" by splitting each pixel into grayscale components. At substep 1406, a matching algorithm is initiated to identify matching points in the pair of images 602, 604, so that points in one image 602 are located along the same line as the other image 604, thereby creating images with the desired epipolar geometry. The matching algorithm is beneficial for adjusting the points with maximum accuracy while still keeping the time required to correlate the points to a minimum. After substep 1406, control is passed to substep 1408, where the vertical shift amounts for the sub-images are obtained, and then to substep 1410, wherein the vertical shift is interpolated for the entire images, 602, 604.

Figure 15:
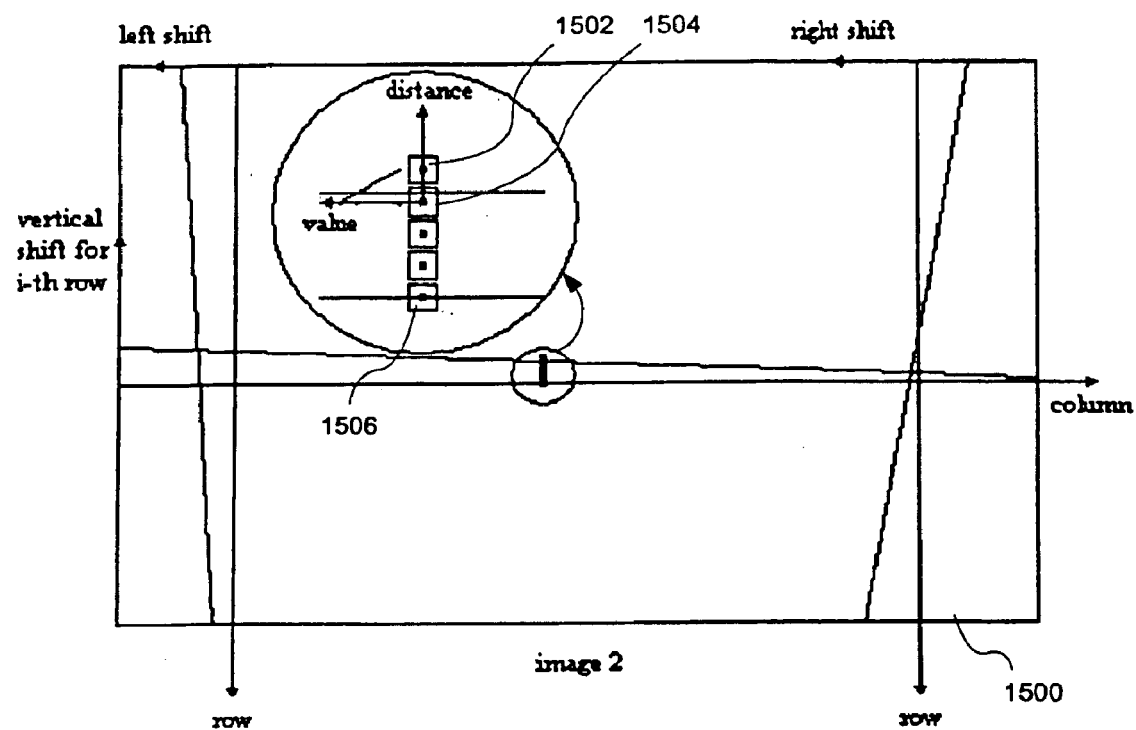
FIG. 15 is an illustration of the pixel shift amounts to remove the vertical parallax according to the method of FIG. 14.

In general, the process of FIG. 14 estimates the epipolar geometry in the left and right parts of the images using a correlation matching technique, and adjusts the rows of pixels line-by-line. The line-to-line row adjustment is based on the premise that the vertical parallax is a linear function of both the column and row number. Accordingly, for every pixel in every row of the second image, another vertical parallax exists, which is not an integer value. Every pixel in the second image must be recalculated at the new shifted position. The new grayscale value of the pixel is calculated by the linear interpolation between the values of the nearest pixels. For example, in the illustration 1500 of FIG. 15, the resulting shift is minus 3.3 pixels, so the fourth 1502 and third 1504 pixels above the point 1506 to be corrected are used to calculate a new weighted value for substitution. The resulting pair of images has matching pixels lying on the same row, which is ideal for stereoscopic perception and aids in image analysis. One technical advantage of this embodiment entails the simultaneous correction of keystone distortion along with any other linear distortions, which cause vertical parallax. For example, such distortions occur when the axis of the C-arm rotation is not parallel to the columns of sensors on the digital plates 808, 810, in which case part of the image or the entire image could be shifted vertically resulting in distortion even more sever than keystone distortion.

Figure 16:
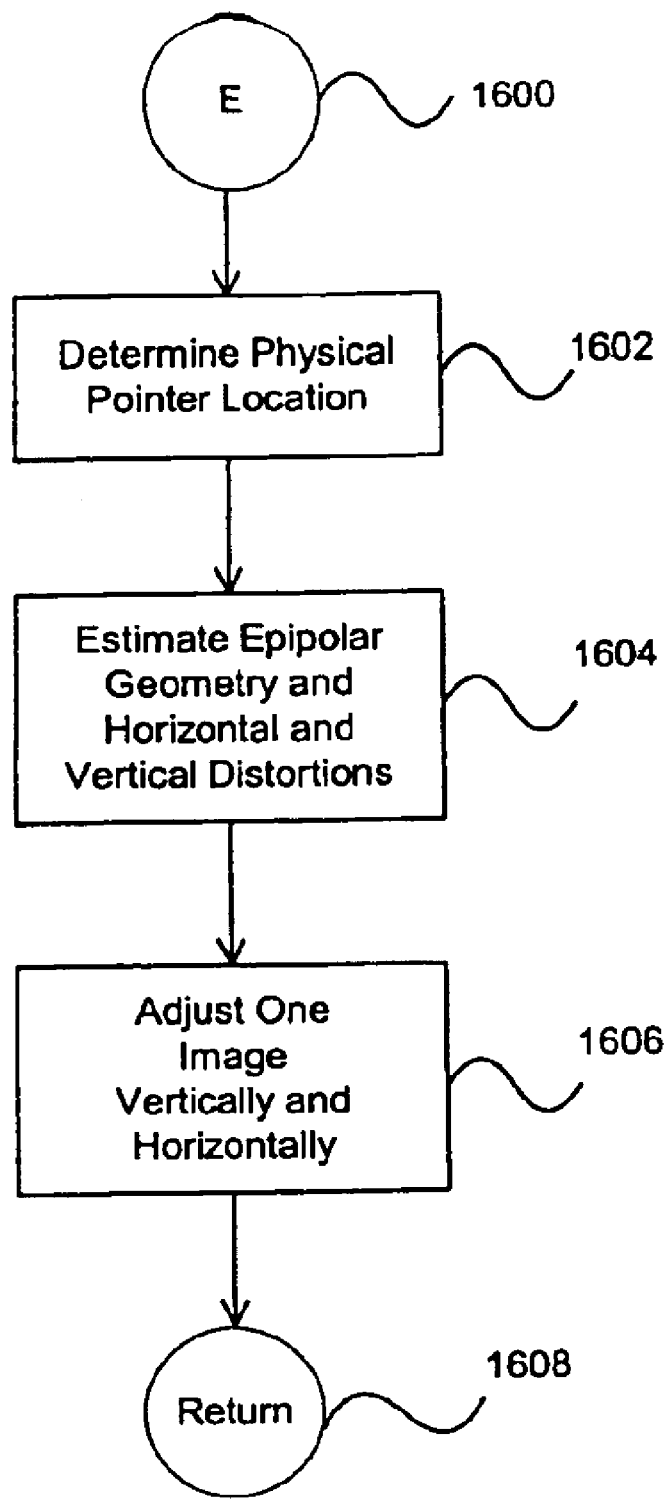
FIG. 16 is a flowchart of an alternative method 1004' for eliminating Keystone distortion amongst the pair of images 202, 204, 603, 604, 902, 904 according to the method of FIG. 10.

Referring to FIG. 16, an alternate embodiment as indicated by process 1004' for eliminating keystone distortion amongst the pair of stereo images is described as comprising several substeps for using physical pointers to recover the epipolar geometry. Such pointers can be located anywhere around the object, and must be present in the images. At substep 1600, control is passed to substep 1602, where the physical pointer location is determined. Referring back to FIG. 2, two or more distinct physical pointers 212, 214, 216, 218 are disposed on object 206 (e.g., a body) being radiographed. For example, the physical pointers 212, 214, 216, 218 could be one or more small objects attached to the body such as special ink marks, small metal balls, foil stickers, or other items. The pointers 212, 214, 216, 218 may be artificially (e.g., markers) created or may exist naturally (e.g, tumor, bone). Alternatively, the physical pointers need not even be attached to the body. For example, the pointers could be placed on poles near the body. In another alternative embodiment, the physical pointers can be embodied inside the object (e.g., body) as distinct item(s) of interest (e.g., bone, tumor, bullet). The only constraint on the physical pointers (and item(s) of interest) is that the radiograph image containing these pointers must have features that are distinguishable from other subject matter in and around the object and must be captured in the images, as seen in 212-L, 212-R, 214-L, 214-R, 216-L, 216-R, 218-L, and 218-R.

The physical pointers 502, 212, 214, 216, 218 can be used as reference points to determine the vertical shift between the same matching points. The images of the matching points (e.g., 212-L and 212-R; 214-L and 214-R; 216L and 216-R; 218-L and 218-R) are shown in the left and right radiographs 202, 204. Alternatively, the object itself may be rotated. In yet other embodiments, the images may be converted to digital images by scanning them. Once the image capture is complete, the previously placed physical pointers are located in the radiographs in substep 1602. If small steel balls were used, the balls will be represented by dark spots in each quarter of the image.

Figure 5:
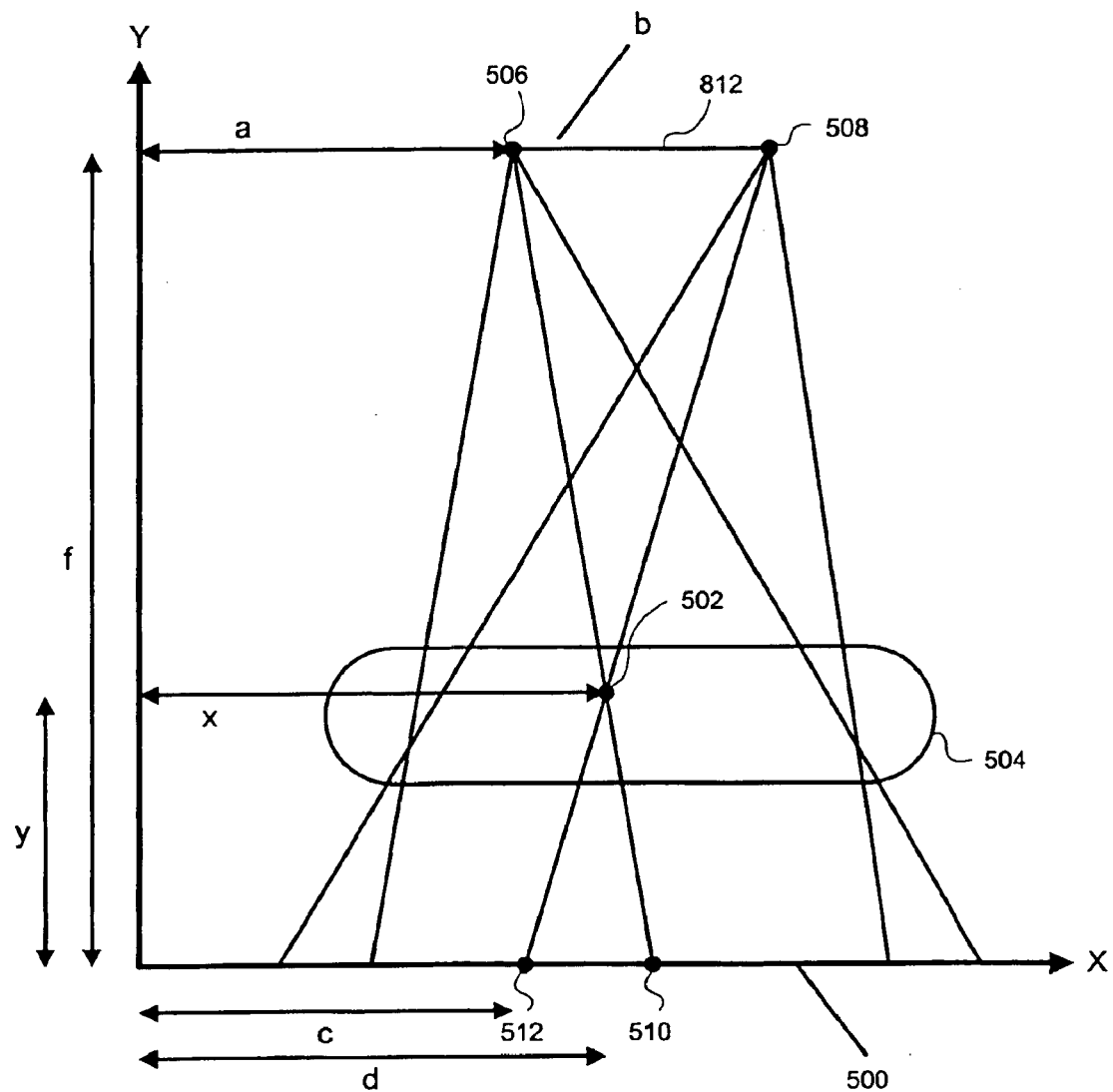
FIG. 5 is an illustration of the geometry for correcting distortion amongst the pair of images 202, 204, 602, 604 using at least one reference point 502 according to an embodiment of the present invention.

FIG. 5 illustrates an X-Y coordinate system 500 and the geometry of the x-ray sources being parallel to the capture screen. As shown, the Y-axis is perpendicular to the capture screen and the X-axis is parallel to the base line 812 of the imagining device. In this embodiment, the x and y origins are the coordinates of an item of interest 502 (e.g., bullet, bone) within or disposed about (e.g., marker) an object 504 (e.g., a body). Simple geometry of the system 500 gives us the necessary relationships between parameters:

$$x = \frac{da + db - dc}{b + d - c}, \quad (5)$$

$$y = f\frac{d - c}{b + d + c}, \quad (6)$$

where f is the focal length, b is the distance between the locations 506, 508 of the X-ray imaging device when taking a first image and taking a second image respectively (the base), a the X coordinate of the X-ray imaging device when capturing the first image is 602, c is the X coordinate of the item 502 in the first image 602 and d is the X coordinate of the item 502 in the second image 604.

When the X-ray is taken, however, the object 504 (e.g., body) is "flattened" from three dimensions to two dimensions, resulting in the loss of information, such as spatial size and the spatial relations between objects in the image. One way of replacing the lost information is to take two or more radiographs of the same object from different angles, and to extrapolate the spatial information accordingly. In order to combine the images properly, however, portions of the first image 510 must be corresponded to the relevant portions in the second image 512.

It is often assumed that the stereo image correspondence problem is a one-dimensional search problem. This is true if the spatial relationships between the locations from which the images were taken, called the epipolar geometry, is known from the beginning. In the classical method, known as the calibrated route, both X-ray sources 506, 508 are calibrated with respect to some world coordinate system. That information is then used to calculate the epipolar geometry by extracting the essential matrix of the system as indicated by substep 1604. The three-dimensional Euclidean structure of the imaged scene can then be computed.

If the X-ray sources 506, 508 are not carefully placed or the angles used to capture the radiograph images result in keystone distortion (vertical parallax), however, recovery of the epipolar geometry is necessary. In the ideal case, the epipolar lines of the two images are horizontal. In order to guarantee horizontal epipolar lines, however, it is necessary to set the optical axes of the two X-ray sources 506, 508 in parallel.

Matching points in one image 510 with points in another image 512 where both images are taken of a single scene, called the correspondence problem, remains one of the bottlenecks in computer vision and is important to continued development in this field. As will be more fully described below, the present invention adjusts, as in substep 1606, the points in the second image 512 that correspond to the points in the first image 510, so that the points in the second image 512 are located along the same line as in the first image 510, thereby creating images with the desired epipolar geometry. In alternative embodiments, however, the first 510, second 512 or both images 510, 512 may be adjusted. As soon the correspondence between points in two images is known, it is possible to recover the disparity field, which is the displacement of corresponding points along the epipolar lines in the two images, i.e. c and d parameters in equation 6, equation 7, and FIG. 2.

Another distortion may appear when the base line 812 between two X-ray sources and the plane of the viewing device are not parallel to the horizon, and when the stereo radiograph pairs are obtained with the sideways movement of the object because the axis of rotation is not vertical. This distortion causes shear distortion, which influences the correct estimation of horizontal location for homologous points. The distortion results in a sideways shear of the image pair about the surface of the viewing device, that is, images out of the display device will appear to shear towards the observer, while images behind the surface of the viewing device appear to shear in the opposite direction. This type of distortion may result in the incorrect perception of relative object distance, such images on one side may falsely appear closer than images on the other side. Additionally, motion by the observer may lead to incorrect perception of motion in the image. Horizontal adjustment of the radiographs is performed by placing the base line parallel to the screen and the surface of the display device perpendicular to the optical axis. The same technique described above can then be used to make horizontal adjustment of stereo pairs as in substep 1606. In this case, the radiographs are adjusted such that features within the images are moved to the same rectangular positions, in relation to the reference point(s), (e.g., 212, 214, 216 and 218).

Figure 13:
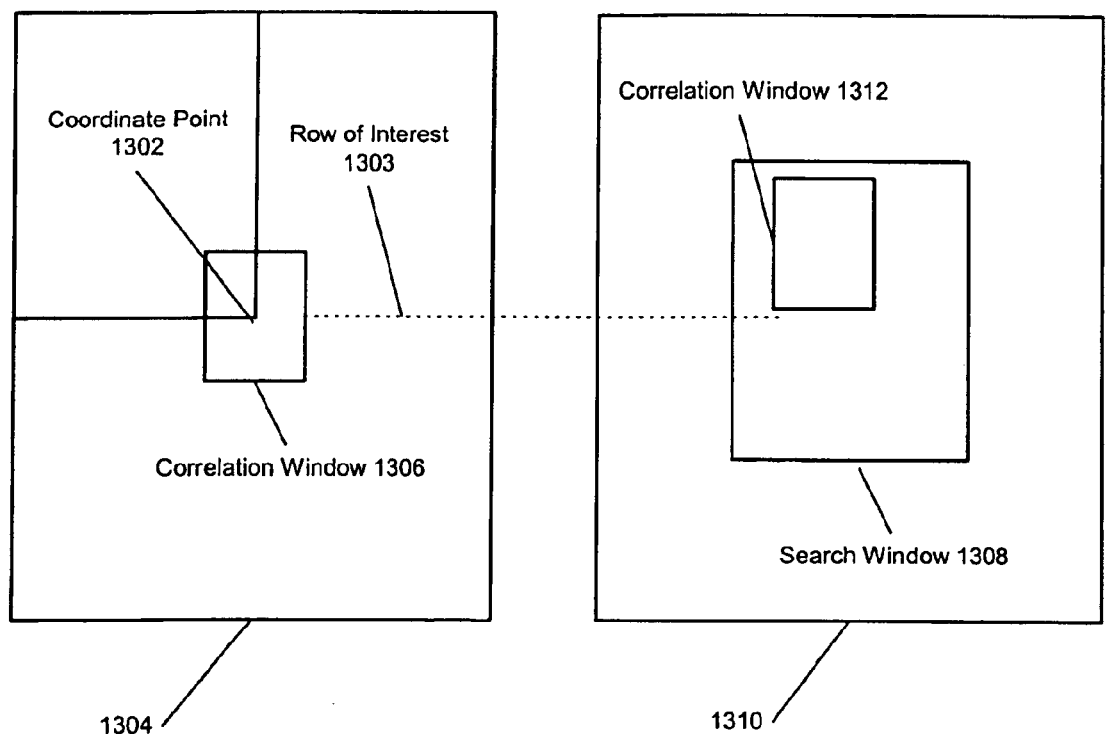
FIG. 13 is an illustration of a method for establishing match candidates amongst pixel points in the pair of images 202, 204, 602, 604.

Referring now to FIG. 13, a technique for establishing match candidates between two images is shown. For a given point 1302 along a particular row of interest 1303 in the first image 1304, a correlation window 1306 centered at this point 1302 is created. Once the point 1302 has been selected in the first image 1304, a search window 1308 is selected in the second image 1310. The size and location of the search window 1308 may reflect some a priori knowledge about the disparities between the points in the images 1304, 1310 if desired. If no such knowledge is available, the whole image may be searched.

Once the search window 1308 has been selected, a correlation operation is performed. First, a correlation window 1306 about the point 1302 of interest in the first image is created. The correlation window 1306 may be of any size, but a larger window will yield less precise results. The value of one or more properties of the area within the correlation window 1306 of the first image 1304 are then determined.

A correlation window 1312 is then centered around every point within the search window 1308 in the second image 1310. The value of one or more properties for areas within window 1312 for every point is then determined. Each correlation window 1312 for every point within the search window 1308 in the second image 1310 is given a correlation score based on its similarity to the properties of the correlation window 1306 of the first image 1304.

A constraint on the correlation score can then be applied in order to select the most consistent matches: for a given couple of points to be considered as a match candidate, the correlation score must be higher than a given threshold, for example. Using the correlation technique, a point in the first image may be paired to several points in the second image and vice versa. Several techniques exist for resolving the matching ambiguities but, for simplicity, the points with the highest correlation score are selected. While this method does provide a number of match candidates, there are no guarantees on the accuracy of the match. Assuming the threshold is set prior to processing, there is no guarantee that only the most precise matches will be used. Although this is the preferred technique for matching the points in the images, other matching techniques may also be used including correlation-based, MRF-based, feature-based and phase-based matching.

Referring back to FIG. 4, step 414 involves changing the screen parallax so as to maximize the number of people who may view the stereoscopic image. Once calculations are completed using the above described embodiments, in order to enable viewers to perceive and view the results in the best possible manner, the depth range is minimized and the primary area of interest is located near the surface of the display device. There are a variety of ways in which to adjust the screen parallax so as to locate the primary area of interest near the surface of the display device and to minimize depth range. In general, the adjustment of the screen parallax entails the movement of the images to locate the object or item of interest near the front surface of the display device, whereas the remaining portions of the image appear behind the front surface of the display device. For example, in one embodiment, the primary area of interest (e.g., object, items of interest) can be moved manually towards the front surface of the display device until the best depth of perception of the horizontal parallax is perceived. Alternatively, the primary area of interest may be automatically located in virtual space at the front surface of the display device while remaining portions of the image may be placed behind the front surface when the geometric location of fiducial points (e.g., physical or artificial reference points) disposed about the object are known. With reference to the fiducial points (e.g., 214-L, 214-R as in FIG. 2, but transformed into virtual space), the images are moved such that the object appears at the front surface of the display device. Similarly, the item of interest (e.g., tumor, broken bone, bullet) disposed within the object (e.g., chest) may be moved with reference to the fiducial points (e.g., 212-L, 212-R; 214-L, 214-R; 216-L, 216-R; 218-L, 218-R) in virtual space, so that the item is located near the front surface of the display device, thereby improving the perception of the item of interest to many viewers. In either manner, the horizontal parallax of the primary area of interest is adjusted so that it is perceived as being toward the front surface of the display device (i.e., closer to the viewers), where viewers may easily see and focus their attention upon the primary area of interest. It will be further appreciated that other parameters and a priori information (e.g., convergence point, axis of rotation of the object) of the object may also be used to adjust the horizontal parallax.

One manner of shifting the images may be accomplished by the graphics engine 130, 302 moving the images towards one another in virtual space. More specifically, the engine 130, 302 moves the images toward each other for a number of pixels to put the optical axis of the X-ray sources (i.e., left and right) in the middle of the stereo image. The frame magnification, which is the ratio of display area width to X-ray source width, can be relied upon to accomplish this effect.

It will be understood by those skilled in the art that the order of steps described by the above figures is merely one preferred embodiment of the present invention, and that the various steps may be performed in alternative steps. Still other changes to the execution order of the steps of the present invention will be readily apparent to those skilled in the art. While the invention has been particularly shown and described with reference to a preferred embodiment and several alternate embodiments, it will be understood by persons skilled in the relevant art that various changes in form and details can be made therein without departing from the spirit and scope of the invention.

What is claim is:

1. A method for stereo image processing of an object, the method comprising the step of:

obtaining at least a pair of stereo images each having a plurality of pixels, said stereo images being a digital representation of a corresponding pair of stereo radiographs taken of the object, wherein the pair of stereo radiographs is obtained by an X-ray imaging device, the X-ray imaging device being moved between times when a first radiograph of the pair of stereo radiographs and a second radiograph pair of the stereo radiographs are obtained;

correcting illumination errors within the pair of stereo images;

removing distortions from the pair of stereo images;

combining pixels of the pair of stereo images into a composite image; and adjusting a corresponding screen parallax for the composite image, wherein the step of correcting illumination errors comprises the substeps of:

selecting a first group of pixels from a first image of the pair of stereo images;

selecting a second group of pixels from a second image of the pair of stereo images, the second group of pixels being respectively associated with the first group of pixels;

determining an intensity level for each pixel in both groups of pixels;

determining a mean intensity level and a variance for each of the first and second groups of pixels;

equalizing the mean intensity level and the variance of the first group and the second group; and adjusting the pixels to equalize the mean intensity level and the variance of the first group and the second group.

2. The method of claim 1, wherein the substep of equalizing the mean intensity level and the variance comprises the further substeps of:

determining a new intensity level for a first pixel and a second pixel, the first pixel being in the first group and the second pixel being in the second group, the new intensity level being between the intensity level of the first pixel and the intensity level of the second pixel; and altering the intensity levels of the first and second pixels to be the new intensity level.

3. The method of claim 1, wherein the intensity level determined for each pixel comprises grayscale values.

4. The method of claim 1, wherein the substep of selecting a first group of pixels comprises the further substep of:

selecting a plurality of pixels forming a line perpendicular to a direction of motion of the X-ray imaging device.

5. The method of claim 1, wherein the substep of selecting a first group of pixels comprises the further substep of:

selecting a plurality of pixels forming a longitudinal line perpendicular to a direction of motion of the X-ray imaging device at a point where the longitudinal line intersects a direction of motion of the X-ray imaging device.

6. The method of claim 1, wherein the stereo radiographs comprise X-ray images.

7. The method of claim 1, wherein the step of correcting illumination errors comprises the substeps of:

selecting a first group of pixels from a first image of the pair of stereo images;

selecting a second group of pixels from a second image of the pair of stereo images;

determining a first mean intensity value and a first variance for the first group of pixels;

determining a second mean intensity value and a second variance for the second group of pixels;

equalizing the first mean intensity value and first variance with the second mean intensity value and second variance, respectively; and adjusting at least one of the first group of pixels and the second group of pixels in response to the substep of equalizing the first mean intensity value and first variance with the second mean intensity value and second variance.

8. The method of claim 7, wherein the substep of adjusting at least one of the first group pf pixels and the second group of pixels comprises the further substep of:

adjusting pixel intensities for the first group of pixels such that the first mean intensity value is equal to the second mean intensity value.

9. The method of claim 7, wherein the substep of adjusting at least one of the first group of pixels and the second group of pixels comprises the further substep of:

adjusting pixel intensities for the second group of pixels such that the second mean intensity value is equal to the first mean intensity value.

10. The method of claim 7, further comprising the substeps of:

determining a third mean intensity value by adjusting pixel intensities of he first group of pixels, wherein said third mean intensity value is between the first mean intensity value and the second mean intensity value;

adjusting the first mean intensity value to be equal to the third mean intensity value; and adjusting the second mean intensity value to be equal to the third mean intensity value.

11. The method of claim 1, wherein the step of adjusting a corresponding screen parallax comprises the substeps of:

displaying the composite image on a display device, the display device including a viewing surface; and locating the object in the composite image near the viewing surface in order to minimize depth range.

12. A method for stereo image processing of an object, the method comprising the step of:

obtaining at least a pair of stereo images each having a plurality of pixels, said stereo images being a digital representation of a corresponding pair of stereo radiographs taken of the object;

correcting illumination errors within the pair of stereo images;

removing distortions from the pair of stereo images;

combining pixels of the pair of stereo images into a composite image; and adjusting a corresponding screen parallax for the composite image, wherein the step of removing distortions comprises the substeps of:

removing depth plane curvature amongst the pair of stereo images by determining a representation of the pair of stereo images, the representation having a parallel geometry with respect to one or more X-ray sources used to form the radiographs, and determining pixel values for the representation based on the plurality of pixels in the pair of stereo images; and removing keystone distortion amongst the pair of stereo images.

13. The method of claim 12, wherein the substep of removing keystone distortion comprises the substeps of:

determining epipolar geometry amongst the pair of images; and shifting the pixels to remove the keystone distortion based on the epipolar geometry determined.

14. The method of claim 13, wherein the substep of determining epipolar geometry comprises the substeps of:

creating a left and right search column on at least one of the pair of stereo images, wherein the pair of stereo images includes at least some overlap area and at least one of the columns includes at least part of the overlap area;

creating two sets of gray-scale sub-images, one set of the sub-images for each of the pair of stereo images;

running a matching algorithm on each point in the right and left search column of each sub-image pair;

calculating a vertical shift between points identified as matching by the matching algorithm;

selecting points with identical vertical shift values; and aligning the points that were not selected in the images by interpolating amongst vertical shift values for each column.

15. The method of claim 12, wherein the object comprises at least one item disposed therewithin, and wherein the substep of removing keystone distortions includes further sub steps, comprising:

determining a location of at least one physical pointer disposed around the object, said physical pointer being captured in the pair of radiographs and represented in the pair of stereo images;

estimating epipolar geometry and horizontal and vertical distortions using the location of the physical pointer in the pair of stereo images; and adjusting at least one image of the pair of stereo images vertically and horizontally to correct for any estimated distortions.

16. The method of claim 15, further comprising the substep of calculating a location of the item.

17. The method of claim 15, wherein the physical pointer comprises an ink mark.

18. The method of claim 15, wherein the physical pointer comprises a metal ball.

19. The method of claim 15, wherein the physical pointer comprises a foil sticker.

20. The method of claim 15, wherein the physical pointer is disposed within the object.

21. A method for stereo image processing of an object, the method comprising the step of:

obtaining at least a pair of stereo images each having a plurality of pixels, said stereo images being a digital representation of a corresponding pair of stereo radiographs taken of the object;

correcting illumination errors within the pair of stereo images;

removing distortions from the pair of stereo images;

combining pixels of the pair of stereo images into a composite image; and adjusting a corresponding screen parallax for the composite image, wherein the object comprises at least one item, and the step of removing distortions from the pair of stereo images includes sub steps for adjusting the radiographs, the substeps comprising:

locating at least one physical pointer disposed around the object;

capturing the pair of stereo radiographs using a radiograph imaging device, wherein the physical pointer is captured in the pair of radiographs;

determining a location of the physical pointer;

estimating geometry and horizontal and vertical distortions using the location of the physical pointer appearing in the pair of stereo images; and adjusting at least one image of the pair of stereo images vertically and horizontally to correct for any estimated distortions.

22. The method of claim 21, wherein the physical pointer is disposed within the object, and the geometry includes epipolar geometry.

23. The method of claim 21, wherein the object comprises a body, and the item is selected from the group comprising a bullet, bone, muscle and tissue.

24. A computer-implemented method for stereo image processing of at least one pair of stereo images of an object, wherein the pair of stereo images includes a plurality of pixels and is obtained from a pair of stereo radiographs taken of the object, the method comprising the steps of:

correcting illumination errors within the pair of stereo images;

removing distortions from the pair of stereo images; and adjusting a corresponding screen parallax for a composite image, the composite image being a combination of the pixels of the pair of stereo images, wherein the step of removing distortions from the pair of stereo images comprises the substeps of:

removing depth plane curvature amongst the first and second images by determining a representation of the pair of stereo images, the representation having a parallel geometry with respect to one or more X-ray sources used to form the radiographs and determining pixel values for the representation based on the plurality of pixels in the pair of stereo images; and removing keystone distortion amongst the first and second images.

25. The computer-implemented method of claim 24, wherein the step of correcting illumination errors comprises the substeps of:

selecting a first group of pixels from a first image of the pair of stereo images;

selecting a second group of pixels from a second image of the pair of stereo images, the second group of pixels being associated with the first group of pixels;

determining an intensity level for each pixel in both groups of pixels;

determining a mean intensity level and a variance for each of the first and second groups of pixels;

equalizing the mean intensity level and the variance of the first group and the second group; and adjusting the pixels to equalize the mean intensity level and the variance of the first group and the second group.

26. The computer-implemented method of claim 25, wherein the substep of equalizing the mean intensity level and the variance comprises the further substeps of:

determining a new intensity level for a first pixel and a second pixel, the first pixel being in the first group and the second pixel being in the second group, the new intensity level being between the intensity level of the first pixel and the intensity level of the second pixel; and altering the intensity level of the first and second pixels to be the new intensity level.

27. The computer-implemented method of claim 25, wherein the second group of pixels is selected according to a matching algorithm.

28. The computer-implemented method of claim 25, wherein the second group of pixels is selected at a location in the second image corresponding to an equivalent location in the first image of the first group of pixels.

29. The computer-implemented method of claim 25, wherein the intensity level comprises grayscale values.

30. The computer-implemented method of claim 24, wherein the substep of removing keystone distortion comprises the substeps of:

determining epipolar geometry amongst the pair of stereo images; and shifting the pixels to remove the keystone distortion based on the epipolar geometry determined.

31. The computer-implemented method of claim 24, wherein the step of adjusting a corresponding screen parallax for a composite image comprises the substeps of:

displaying the pair of stereo images on a display device, the display device including a viewing surface; and locating the object near the viewing surface in order to minimize depth range.

32. A system for stereo image processing of an object, said system comprising:

obtaining means for obtaining at least one pair of stereo images, the stereo images being a digital representation of a corresponding pair of stereo radiographs taken of the object, the pair of stereo images including a first image and a second image both having a plurality of pixels;

communicatively coupled to the obtaining means, means for correcting illumination errors within the pair of stereo images;

coupled to the means for correcting illumination errors, means for removing distortions from the pair of stereo images; and coupled to the means for removing distortions, means for adjusting a corresponding screen parallax for a composite image, the composite image being a combination of the pixels of the first and second Images, wherein the means for removing distortions from the pair of stereo images comprises:

means for rotating the first and second images to eliminating depth plane curvature therewithin; and coupled to the means for eliminating depth plane curvature, means for eliminating keystone distortion within the pair of stereo images.

33. The system of claim 32, wherein the obtaining means comprises an X-ray imaging device for providing the pair of stereo radiographs.

34. The system of claim 33, wherein the obtaining means further comprises a converter coupled to the X-ray imaging device, the converter for converting the pair of stereo radiographs into the pair of stereo images.

35. The system of claim 32, wherein the obtaining means comprises an X-ray imaging device for providing the pair of stereo images.

36. The system of claim 32, further comprising:

coupled to the obtaining means, processing means for processing data representing the stereo images;

coupled to the processor, a storage device;

coupled to the processor, a computer readable medium; and coupled to the processor, a display device for displaying the composite image.

37. The system of claim 32, wherein the means for correcting illumination errors comprises:

means for selecting a first group of pixels from the first image and for selecting a second group of pixels from the second image, the second group of pixels being associated with the first group of pixels;

coupled to the means for selecting the first group and second group of pixels, means for determining an intensity level for each pixel in both groups of pixels;

coupled to the means for determining an intensity level, means for determining a mean intensity level and a variance for each of the groups of pixels; and coupled to the means for determining a mean intensity level and a variance, altering means for altering the intensity level of the pixels of the first group to approximate the intensity level of the pixels in the second group.

38. The system of claim 32, wherein the means for eliminating keystone distortion within the pair of stereo images comprises:

means for calculating a shift amount for eliminating the keystone distortion; and coupled to the means for calculating a shift amount, means for moving the pixels of the first and second images towards each other by the calculated shift amount.

39. The system of claim 32, wherein the means for eliminating keystone distortion within the pair of stereo images comprises:

means for determining a location of at least one physical pointer around the object, wherein the physical pointer is captured in the pair of stereo radiographs;

coupled to the means for determining a location, estimating means for estimating epipolar geometry and horizontal and vertical distortions using the location;

coupled to the estimating means, adjusting means for adjusting at least one of the pair of stereo images vertically and horizontally to correct for any estimated distortions; and coupled to the adjusting means, means for calculating a location of the item.

40. A computer readable medium containing a computer program product for stereo image processing of an object, the computer program product including instructions for directing a computer to execute operations comprising the steps of:

correcting errors resulting from at least one differently illuminated pair of stereo images of the object, said stereo images including a plurality of pixels and corresponding to a pair of stereo radiographs of the object;

removing depth plane curvature from the pair of stereo images by determining a representation of the pair of stereo images, the representation having a parallel geometry with respect to one or more X-ray sources used to form the radiographs, and determining pixel values for the representation based on the plurality of pixels in the pair of stereo images;

removing keystone distortions from the pair of stereo images; and adjusting a corresponding screen parallax for a composite image, the composite image being a combination of the pair of stereo images.

41. The computer readable medium of claim 40, wherein the operations further comprise the steps of:

displaying the composite image on a display device, the display device including a viewing surface; and locating the object appearing in the composite image near the viewing surface in order to minimize depth range.

* * * * *

UNITED STATES PATENT AND TRADEMARK OFFICE
CERTIFICATE OF CORRECTION

PATENT NO. : 6,862,364 B1  
APPLICATION NO. : 09/767210  
DATED : March 1, 2005  
INVENTOR(S) : Alexander Berestov Page 1 of 1

It is certified that error appears in the above-identified patent and that said Letters Patent is hereby corrected as shown below:

IN THE ABSTRACT
   Line 1, "Xray" should read --X-ray--.

COLUMN 5
   Line 6, "keystone)" should read --(keystone)--.

COLUMN 10
   Line 66, "values $\left\{{}_i^1\right\}$ and $\left\{{}_i^2,\right\}$" should read --values $\left\{x_i^1\right\}$ and $\left\{x_i^2,\right\}$--.

COLUMN 20
   Line 67, "sub steps," should read --substeps,--.

Signed and Sealed this

Fifth Day of February, 2008

JON W. DUDAS  
*Director of the United States Patent and Trademark Office*